United States Patent
Rudrakar et al.

(10) Patent No.: US 12,548,013 B2
(45) Date of Patent: Feb. 10, 2026

(54) ACCELERATED SECURITY FOR REAL-TIME DETECTION OF SUSPICIOUS TRANSACTIONS

(71) Applicant: NICE LTD., Ra'anana (IL)

(72) Inventors: Nikhil Jivanrao Rudrakar, Pune (IN); Harshad Wani, Nashik (IN); Ayush Guha, Pune (IN)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 18/664,578

(22) Filed: May 15, 2024

(65) Prior Publication Data

US 2025/0356344 A1    Nov. 20, 2025

(51) Int. Cl.
*G06Q 20/36* (2012.01)
*G06Q 20/40* (2012.01)

(52) U.S. Cl.
CPC ..... *G06Q 20/3674* (2013.01); *G06Q 20/4016* (2013.01)

(58) Field of Classification Search
CPC .............................................. G06Q 20/00–425
See application file for complete search history.

(56) References Cited

U.S. PATENT DOCUMENTS

| | | | |
|---|---|---|---|
| 2012/0096557 A1* | 4/2012 | Britton | G06Q 20/40 726/25 |
| 2013/0024361 A1* | 1/2013 | Choudhuri | G06Q 40/02 705/39 |

OTHER PUBLICATIONS

Gantz, When Markets Are Bearish, Beware of Stock Manipulation, Jun. 9, 2022, Forbes.

* cited by examiner

*Primary Examiner* — Mohammad A. Nilforoush
(74) *Attorney, Agent, or Firm* — PEARL COHEN ZEDEK LATZER BARATZ LLP

(57) ABSTRACT

A device, system and method for accelerated compliance testing for real-time detection of suspicious transactions in a transaction stream. A machine learning model may determine a global trend of cumulative transaction behavior based on all, a majority or a representative subset, of the stream of transactions. For each transaction in the stream, a skip rule engine may sort each security compliance test to be skipped or not skipped based on the test's relevance to the global trend of the cumulative transaction behavior. The not skipped security compliance tests may be executed in real-time for each transaction in the stream to generate real-time partial security assessments therefore comprising real-time suspicious transaction alerts. The remaining tests may be skipped in real-time and executed, at a time delay after transaction times, to generate time delayed supplemental security assessments therefore comprising time delayed suspicious transaction alerts to complete all compliance testing.

16 Claims, 27 Drawing Sheets

Continue from Fig. 6A

```
def trend(x): # Calculate the trend of an instrument with percentage of skip rate defined (gaussian curve)
    if x > -0.5 and x <= 0.5:
        return 'Slight or No change: Skip %: 0'
    elif x > 0.5 and x <= 1:
        return 'Slight Positive: Skip %: 0'
    elif x > -1 and x <= -0.5:
        return 'Slight Negative: Skip %: 25'
    elif x > 1 and x <= 3:
        return 'Positive: Skip %: 50'
    elif x > -3 and x <= -1:
        return 'Negative: Skip %: 50'
    elif x > 3 and x <= 7:
        return 'Among top gainers: Skip %: 75'
    elif x > -7 and x <= -3:
        return 'Among top Losers: Skip %: 75'
    elif x > 7:
        return 'Bull Run: Skip %: 100'
    elif x <= -7:
        return 'Bear Run: Skip %: 100'

GL_df['Trend'] = np.nan(GL_df['Day_Perc_Change'].count())
GL_df['Trend'] = GL_df['Day_Perc_Change'].apply(lambda x:trend(x))
GL_df.head(10)
```

| Date | Open | High | Low | Close | Adj Close | Volume | Day_Perc_Change | Trend |
|---|---|---|---|---|---|---|---|---|
| 2022-05-05T00:00:00.000 | 6.35 | 6.55 | 6.34 | 6.51 | 6.51 | 23142600 | 4.3269230769 | Among top gainers: Skip %: 75 |
| 2022-05-06T00:00:00.000 | 6.58 | 6.59 | 6.45 | 6.53 | 6.53 | 14021600 | 0.3072196621 | Slight or No change: Skip %: 0 |
| 2022-05-07T00:00:00.000 | 6.71 | 6.8 | 6.67 | 6.78 | 6.78 | 13012100 | 3.8284899204 | Among top gainers: Skip %: 75 |
| 2022-05-08T00:00:00.000 | 6.72 | 6.78 | 6.61 | 6.63 | 6.63 | 11587700 | -2.2123893806 | Negative: Skip %: 50 |
| 2022-05-09T00:00:00.000 | 6.61 | 6.81 | 6.6 | 6.75 | 6.75 | 14424900 | 1.8099547011 | Positive: Skip %: 50 |
| 2022-05-10T00:00:00.000 | 6.84 | 6.88 | 6.83 | 6.78 | 6.78 | 14426800 | 0.4444444444 | Slight or No change: Skip %: 0 |
| 2022-05-11T00:00:00.000 | 6.92 | 7.08 | 6.88 | 7.01 | 7.01 | 13864900 | 3.3923303835 | Among top gainers: Skip %: 75 |
| 2022-05-12T00:00:00.000 | 7.05 | 7.11 | 6.93 | 7.06 | 7.06 | 15775700 | 0.7133066766 | Slight Positive: Skip %: 25 |
| 2022-05-13T00:00:00.000 | 6.96 | 7.11 | 6.94 | 7.07 | 7.07 | 13202600 | 0.1416433565 | Slight or No change: Skip %: 0 |
| 2022-05-16T00:00:00.000 | 7.12 | 7.26 | 7.1 | 7.22 | 7.22 | 17797700 | 2.1216407705 | Positive: Skip %: 50 |

ACCELERATED SECURITY FOR REAL-TIME DETECTION OF SUSPICIOUS TRANSACTIONS

FIELD OF THE INVENTION

Embodiments of the invention relate to the field of detecting suspicious transaction, for example, due to money laundering, fraud, or non-compliant behavior, using an artificial intelligence system. Embodiments of the invention more specifically relates to a system and method for accelerating suspicious transaction detection to analyze fast transaction streams in real-time.

BACKGROUND OF THE INVENTION

As global trade activity continues to grow, present-day transaction compliance teams are burdened with an overwhelming and growing number of associated alert investigations. Whereas only 1% or less of transactions are attributed to true alerts, all transactions are typically investigated to meet compliance regulations. It is furthermore important to execute compliance investigations in real-time to allow preventative anti-fraud actions, such as, cancelling or delaying suspicious transactions before they are executed, predicting fraud before its committed, etc. This creates a massive computational burden for compliance teams.

Attempts to parallelize this computational load is impractical because the chronology of serialized transactions provides valuable inter-transaction information obtained by sequentially processing transactions that is important to accurately detect transaction integrity. There is thus limited benefit to parallel processing techniques as it loses important information embedded in a sequence of transactions. In addition, false positive alerts in the system should be effectively addressed to improve the accuracy of fraud detection.

Accordingly, there is a need in the art to efficiently and accurately automate transaction security compliance in real-time.

SUMMARY OF THE INVENTION

According to some embodiments of the invention, there is provided a device, system and method for accelerating security compliance tests to achieve real-time fraud detection capabilities on a transaction stream that is otherwise too fast to execute all security compliance tests in real-time. Embodiments of the invention may use machine learning to, based on the incoming stream of transactions, determine global transaction environment behavior (e.g., bear market, bull market, volatility index, etc.) and execute in real-time a partial subset of the compliance tests having relatively higher relevance to that global transaction environment behavior and deprioritize, skip or postpone executing not in real-time (e.g., during non-business hours) a remaining partial subset of the compliance tests having relatively lower relevance to that global transaction environment behavior. Accordingly, the compliance tests with highest relevant to market conditions may be executed in real-time (excluding low-impact irrelevant or less relevant tests), thereby realizing the greatest compliance detection accuracy at computational cost sufficiently low to enable real-time fraud detection and preempt anti-fraud actions. Relatively low relevance compliance tests may be excluded from the initial partial real-time fraud assessment entirely or partially, for example, replaced with pseudo-tests, such as, a paired down tests, simpler replacement tests, a machine learning prediction of test results, etc. In various embodiments, compliance tests may be sorted into two classes—e.g., skip (delayed execution) or no skip (real-time execution), any multiple number of (e.g., three or more) classes—e.g., primary (real-time execution), secondary (executed after primary class, which may or may not be real-time depending on the incoming data rate), and tertiary (executed after secondary class, which may or may not be real-time depending on the incoming data rate), or sorted into an ordered ranking based on each test's individual relevance to the global market trend or individual instrument trend. In one example, skip rules may each have a "skip ness" measuring a priority or degree with which a skip rule is applied individually to each market instrument based on the instrument's individual market performance. Other sortings for prioritizing compliance test may be used.

An embodiment of the invention provides a device, system, and method for analyzing a stream of transactions received at an incoming data rate that exceeds the computational capability of a designated network of computers to execute a complete set of a plurality of security compliance tests thereon in real-time. A machine learning model may predict a global trend of cumulative behavior of the transactions, for example, based on all, a majority or a random or pseudo-randomly selected representative subset, of the transaction stream. In various examples, the global trend may be a bullish or bearish market, up/down/sideways trends, consumer sentiment, consumer confidence, volatility, etc. Based on the global trend, a skip rule engine may sort each transaction in the stream to skip or not skip each of the plurality of security compliance tests based on each test's relevance to the global trend of the cumulative behavior of the transaction stream. Security compliance tests associated with a relatively high, above threshold or maximum relevance to the global trend may be sorted into a non-skip group and security compliance tests associated with a relatively low, below threshold or minimum relevance to the global trend may be sorted into a skip group. The security compliance tests sorted into the non-skip group may be executed on the transactions in real-time to generate a real-time initial partial security assessments for the transactions and triggering real-time alerts indicating suspicious transaction events. The security compliance tests sorted into the non-skip group may not be executed in real-time, but may be skipped and executed at a time delay (e.g., a significant time delay such as minutes or hours after the transaction time) to generate a time delayed partial supplemental security assessment for the transactions comprising time delayed alerts indicating results of the remainder of the skipped tests and completing detection of suspicious transaction events.

A machine learning model may be dynamically updated to adjust the skip rule engine to alter criteria and conditions for skipping security compliance tests trained based on each test's verified historical relevance to the global trend.

In response to receiving the real-time initial partial security assessment comprising a positive indication of suspicious activity associated with a transaction, some embodiments of the invention may automatically execute a fraud prevention action, such as, cancelling or delaying the transaction before it is executed, predicting future downstream fraudulent transactions associated with the transaction before they are committed, altering the security requirements associated with executing the transaction, quarantining funds or accounts associated with the transaction, sending fraud detection alerts to fraud enforcement, etc.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 7-10 are example simulation results generated by data structures (e.g., of FIGS. 2A-6D), in accordance with some embodiments of the invention;

FIGS. 11-14 are example user-controllable interfaces for a compliance case, in accordance with some embodiments of the invention;

Figure 1:
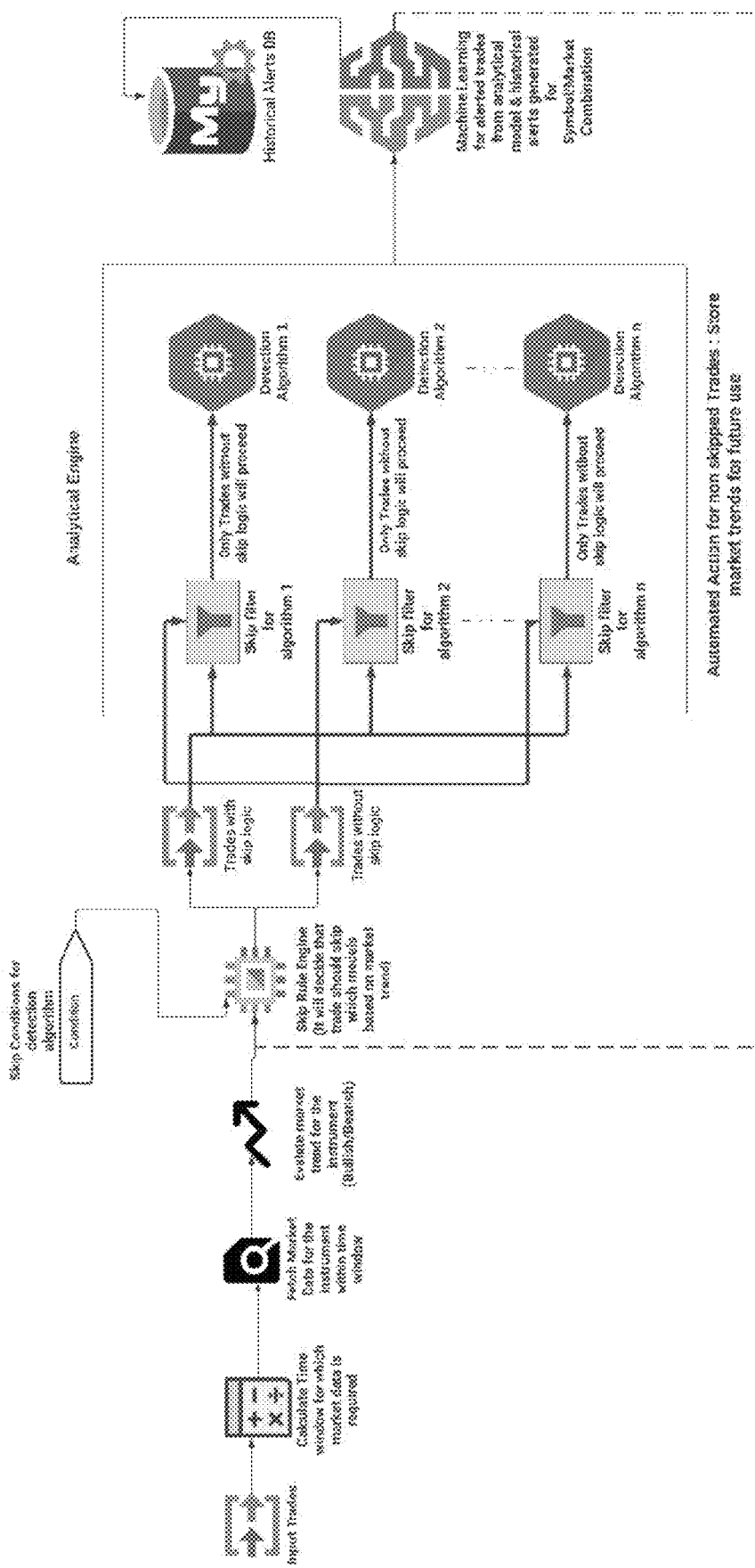
FIG. 1 is a schematic illustration of data structures and a flowchart of a method for accelerated compliance testing for real-time detection of suspicious transactions, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In some cases, a network of computers is designated to execute a security compliance engine for a stream of trade activity received with a data rate or accumulated volume that exceeds the network's computational capability to execute all compliance tests thereon in real-time. In some embodiments, compliance testing may be executed exclusively at that fixed computer network (precluding any additional or alternative external computers), for example, for security, privacy and/or protocol reasons. When compliance tests exceed the network's computation capability, compliance testing is conventionally time delayed, lagging behind the incoming transmission rate of the real-time transaction stream, making it impractical or impossible to enforce real-time fraud detection and execute real-time fraud prevention actions, such as, cancelling or delaying fraudulent transactions before they are executed, preventing future downstream transactions, etc. For example, an initial instruction that triggers initiating a transaction program for executing the transaction may be stopped, blocked or overrode by a subsequent instruction that triggers terminating the transaction program for the transaction.

Embodiments of the invention may reduce data load and increase efficiency of the security compliance engine by selectively executing compliance tests based on each test's degree of relevance to dynamic real-time global market trends. Of the tens or hundreds of compliance tests conventionally run on each transactions, many are irrelevant. For example, a front-running test is typically only relevant during a bull market (irrelevant during a bear market), while a tailgating test is typically only relevant during a bear market (irrelevant during a bull market). Accordingly, embodiments of the invention may execute a skip engine to select and execute in real-time only a subset of compliance tests associated with a relatively high, above threshold or maximum relevance, to a global market trend and skip (not analyze or analyze not in real-time, at a significant time delay, or at an external system) a remainder subset of compliance tests associated with a relatively low, below threshold or minimum relevance to the global market trend. In various embodiments, the skip engine sorts compliance tests into two classes-skip or no skip, sorts compliance tests into any number of a plurality of priority tiers based on each test's relevance to the global market trend and executes that test in order of its priority tier, or ranks compliance tests according to each test's individual relevance to the global market trend or individual instrument trend and executes that test in order according to its ranking.

Global market trends may include any measure of cumulative behavior of a marketplace of one or more instruments (e.g., a tradable asset or a negotiable item, such as, a security, commodity, derivative, or index, or any item underlying these items), such as one or a combination of: a bullish market, a bearish market, up/down/sideways trends, consumer sentiment, consumer confidence, market volatility, etc. Relevance between each compliance test and one or a combination of multiple global market trend(s) may be determined using a machine learning model trained on historical compliance test alerts correlated with trends in a market, instrument, account, etc. Additionally or alternatively, predetermined skip rules may be defined for each model at the market/instrument/account level.

In some embodiments, the skip test may be perpetually activated, whereas in other embodiments, the skip test may be selectively intermittently activated only when an incoming stream of trade activity has a data rate that exceeds the capability of the fixed network of computers to execute all compliance tests thereon in real-time. In such embodiments, the skip test may toggle between active and inactive states when the data load volume respectively exceeds and diminishes below a threshold supporting real-time analysis. When activated, the skip test may be executed continuously or periodically (e.g., at a fixed frequency or variable frequency that may be adjusted according to recent past market trends, compliance test statistics measuring fraud risk level, upon a detected change in global market conditions, upon a machine learning predicted change in market trends, etc.). Each compliance test may be executed per individual transaction, per individual user, per individual transaction event, per individual transaction sequence, or any other group of transactions linked to one or more devices, users or events.

In various embodiments, the skipped compliance tests may be executed at a time delay, e.g., minutes and often hours after executing real-time compliance tests. The time delay may be predetermined, e.g., at off-market hours, or may vary e.g., when the non-skipped compliance tests are finished or when a surplus of computational resources from the fixed network of computers become available.

Prioritizing real-time processing of market-relevant compliance tests and skipping market-irrelevant compliance tests until a time delay (e.g., during non-business hours) may eliminate or defer low return computations to increase overall fraud detection speed and ensure real-time compliance. Quantitatively, executing only the subset of non-skipped compliance tests (and not the skipped tests) may reduce the used computational processing resources and speed up processing times by a percentage or ratio equal to or proportionally to the percentage or ratio of skipped tests. For example, executing 25% of compliance tests in real-time may reduce computational processing usage and speed up processing times by 75%. The remaining 75% of compliance processing resources may be executed later, during the time delay processing.

Reference is made to FIG. 1, which schematically illustrates data structures and a flowchart of a method for accelerated compliance testing for real-time detection of suspicious transactions, in accordance with an embodiment of the invention.

In FIG. 1, a stream of input trades may be received at an incoming data rate. The market data may be, for example, associated with an instrument being processing, an account, a user, a market trade event, etc. In some cases, the input trade stream may be incoming at a data rate or accumulated volume that exceeds a threshold at which a network of computing devices can execute all compliance tests (e.g., detection algorithm 1-$n$, such as tens, hundreds or thousands of detection algorithms) on all the input trades in real-time. FIG. 1 may accelerate compliance testing to provide real-time results and alerts by intelligently skipping a subset of compliance tests with low-relevance to global market trend and execute only a subset of compliance tests with high-relevance to global market trend.

Based on a current trade in the input stream, the market trend may be evaluated, for example by a trained machine learning model, for a calculated time or time window during which the transaction was processed.

A skip rule engine comprises skip logic that defines one or more rule(s) for skipping compliance tests. The skip rule engine applies the skip logic to the current transaction to mark it with a skip or not skip for each test in the complete set of compliance tests (e.g., detection algorithm 1-$n$). In one example, for a Front Running rule, if a market is bearish for that day, the skip logic applies a rule to skip the Front Running detection algorithm for that transaction. Similarly for other models too. These rules can include additional parameters to fine-tune the skip rules, e.g., based on quantity, volume, etc. of a traded instrument.

Accordingly, compliance tests may be bifurcated into skip and no skip groups such that irrelevant or low-relevance tests that would otherwise burden computer resources are eliminated or delayed to prioritize executing relevant compliance tests in real-time. In some embodiments, the ratio of the skip and no skip test groups may be fixed (e.g., to an average that typically accommodates real-time testing) or may be dynamic (e.g., adjusted based on incoming transaction data rates, such that in one embodiment, the number of skipped tests is directly proportional to, and the number of non-skipped tests is indirectly proportional to, the incoming transaction data rate).

Transactions that are skipped may be automatically marked and processed during a delayed time period (e.g., non-business hours, for regulatory purposes).

A historical alerts database may store results of trades processed by the analytical algorithms and their respective market trends so that they may be used in future data processing, for example, to re-train the machine learning model. The database may store trend of an instrument when alert was generated, so that models can be categorized based on market trends in future. Embodiments of the invention may also store the market data patterns for the trades which went through the analytical model, and which can be used in future iterations for writing the skip rules.

Embodiments of the invention may conduct tests and generate alerts for the subset of executed compliance tests (e.g., detection algorithms i, j, k) determined to be relevant (and exclude tests and alerts for the subset of skipped compliance tests (e.g., detection algorithms m, p, q) determined to be irrelevant) based on the market conditions. This may effectively reduce the computational load on analytical engines at the network of computers for faster (e.g., real-time) data processing.

Figure 2A:
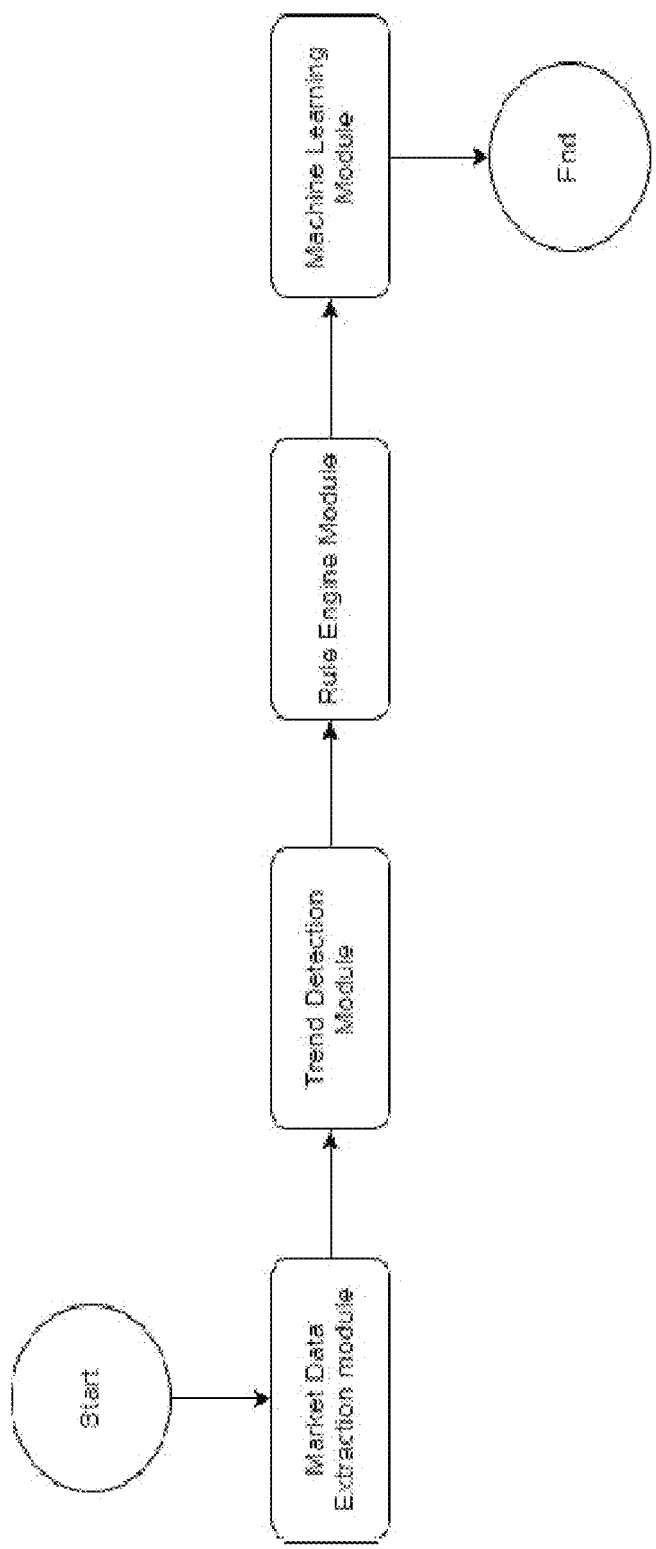
FIGS. 2A-2C are schematically illustrations of system-wide data structures and their associated flowchart for executing methods of accelerated compliance testing, in accordance with some embodiments of the invention.
Figure 2B:
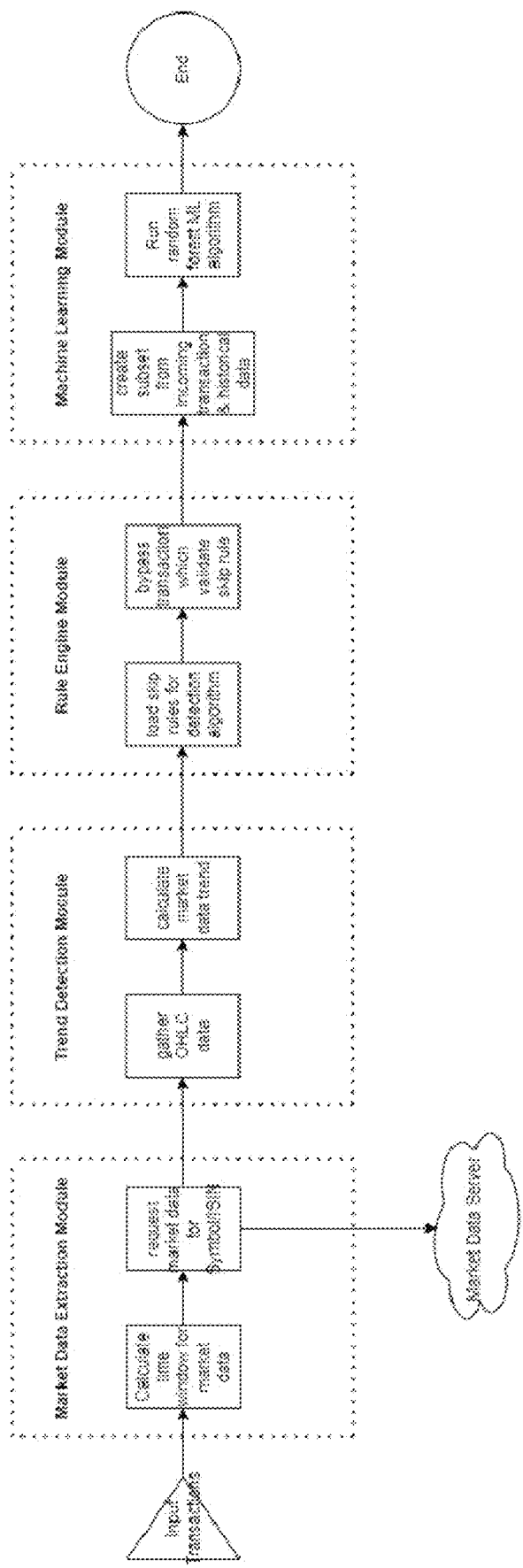
Figure 2C:
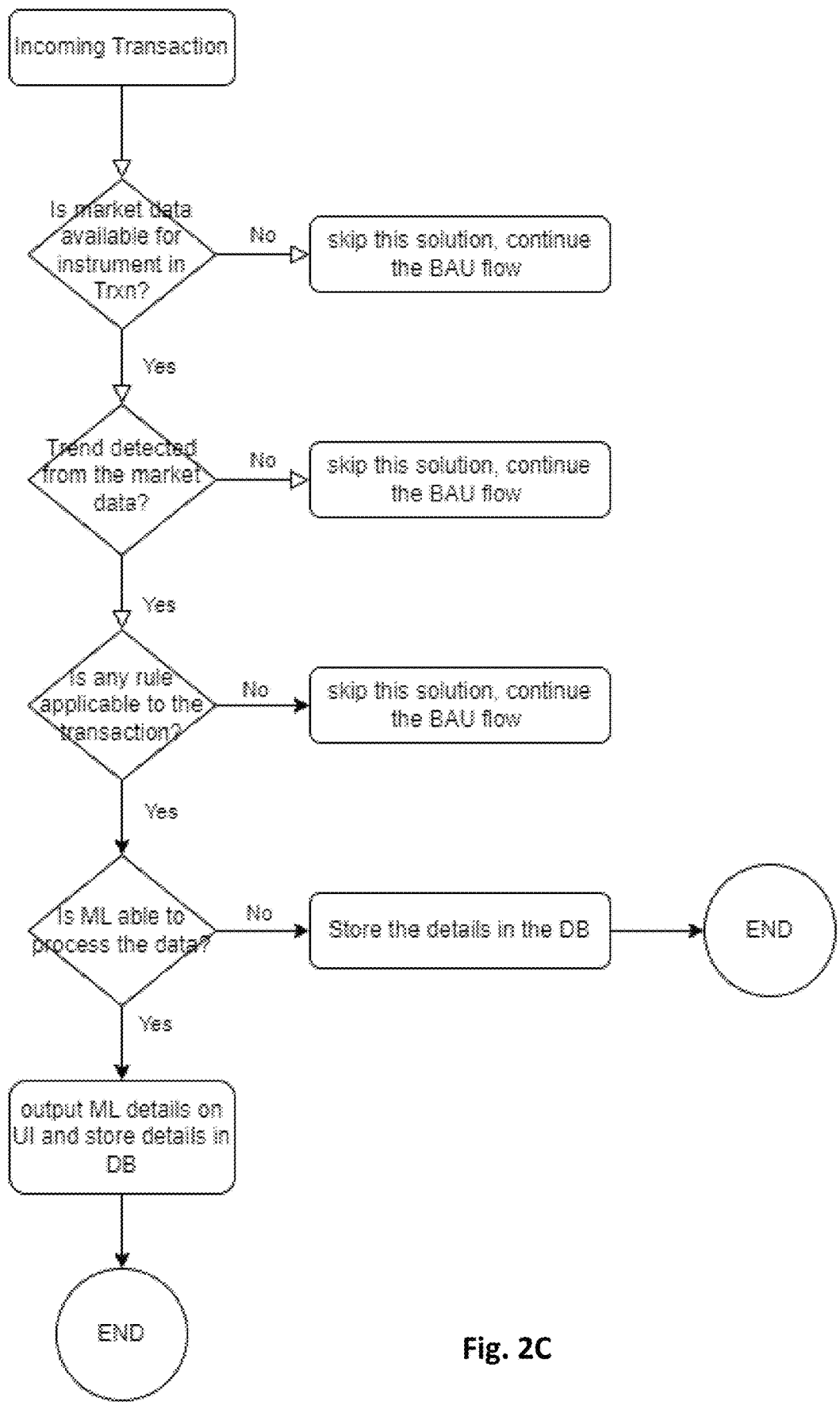

Reference is made to FIGS. 2A-2C, which schematically illustrate system-wide data structures and their associated flowchart for executing methods of accelerated compliance testing, in accordance with some embodiments of the invention.

FIG. 2A depicts market data extraction module, trend detection module, rule engine module, and machine learning module. FIG. 2B provides details of the methods executed by these modules. FIG. 2C is a flowchart of a method performed by these modules.

Initially, incoming transactions may be ingested by the market data extraction module. The market data extraction module may calculate a time window and request market data (e.g., for symbol/ISIN).

Next, those transactions ingested and enriched with market data for the traded instrument may then be sent to the trend detection module that gathers market data (e.g., OHLC (open-high-low-close) data) and calculates a global market trend based thereon.

Next, the rule engine module may load the skip rules for the detection algorithm and may decide to bypass or skip specific tests (e.g., fraud detection algorithms 1-$n$) on specific transactions determined to be irrelevant or have low relevancy based on the calculated market trend.

Next, those skipped transactions may be sent to the machine learning module to create a subset from incoming transaction and historical data. Inside the machine Learning module, a (e.g., random forest) machine learning algorithm may be executed on the skipped transactions and those details may be stored in a DB.

Figure 3A:
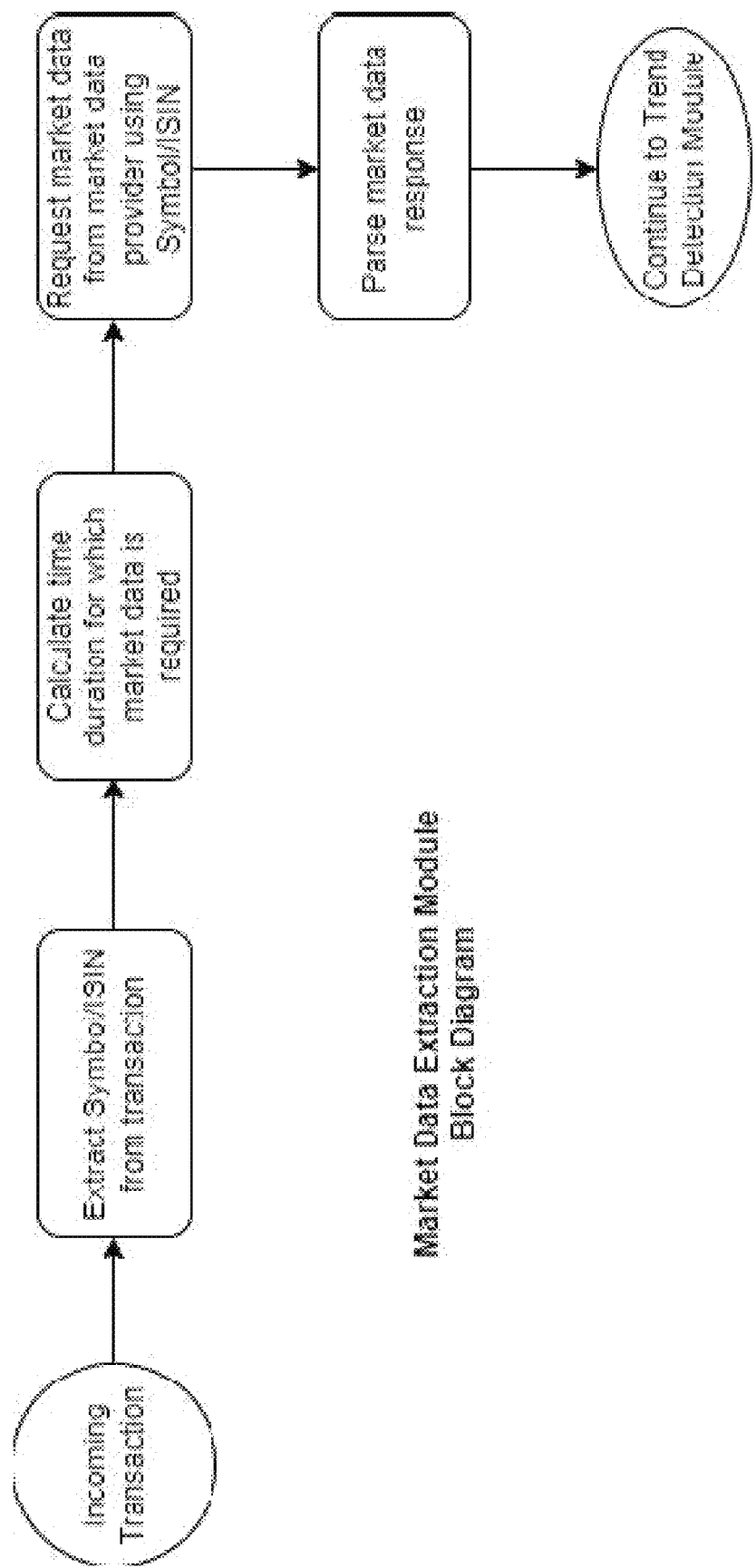
FIGS. 3A-3B are flowcharts of methods executed by a market data extraction module (e.g., of FIGS. 2A-2B), in accordance with some embodiments of the invention.
Figure 3B:
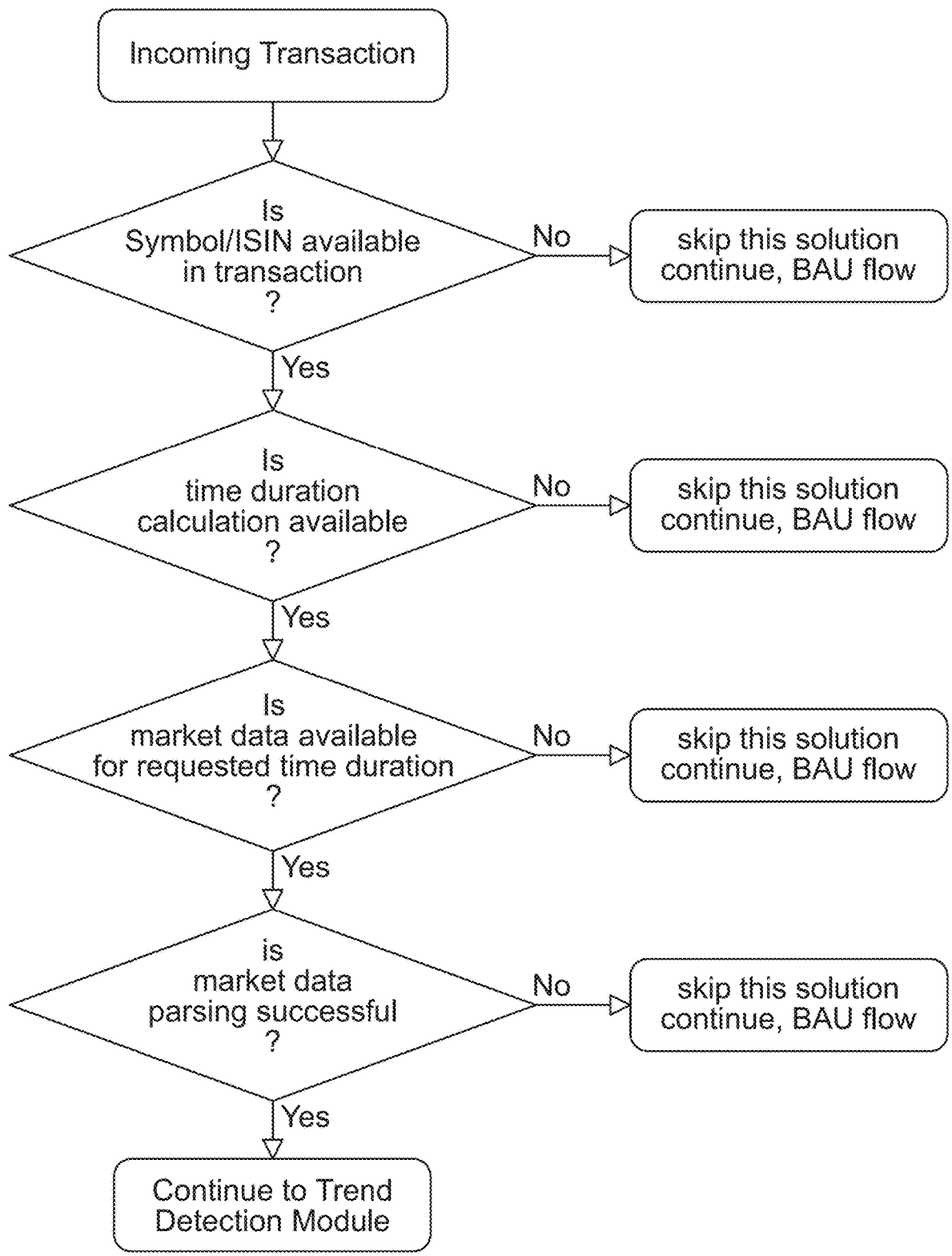

Reference is made to FIGS. 3A-3B, which are flowcharts of methods executed by a market data extraction module (e.g., of FIGS. 2A-2B), in accordance with some embodiments of the invention.

In FIG. 3A, transactions coming into the system are input data for this market data extraction module.

Market data, such as, symbol/ISIN information, may be extracted by the market data extraction module from the transactions.

The market data extraction module may calculate time duration(s) to request market data.

The market data extraction module may request market data using a data extraction identifier, such as the symbol/ISIN, and time duration calculation logic.

The market data extraction module may parse the market data.

The market data extraction module may output this data to the trend detection module to continue, e.g., as shown in FIGS. 4A-4D.

API 1 below shows details of an example market data extraction API configured to fetch market data from the instrument from the transaction:

| (API 1) GET | |
|---|---|
| Description | This API will fetch market data from the instrument from the transaction. |
| URL | /api/marketData/GetOHLCData |
| Request Type | GET |
| Authentication | User Credentials required |
| Request Example | Request:<br>{<br>"instrument": "AMZN",<br>"instrumentType": "SYMBOL",<br>"businessDate":"20240102"<br>} |
| Response Example | Response: 200 Ok<br>{<br>  "listingId": 17,<br>  "businessDate": 20240126,<br>  "todayOpen": 33.91,<br>  "todayClose": 34.345,<br>  "prevClose": 34.645,<br>  "adv30": 3536744.619047619,<br>  "todayVolume": 3714972,<br>  "auctionPrice": 33.91,<br>  "auctionQty": 0.0,<br>  "prevDayVolume": 4441999.0,<br>  "idcSymbol": null,<br>  "prevTradeDate": 0,<br>  "high": 34.545,<br>  "low": 33.86,<br>  "vwapPrice": 34.2826976058,<br>  "cacheAvail": false<br>} |

Reference is made to FIGS. 4A-4D, which are flowcharts of methods executed by a market trend detection module (e.g., of FIGS. 2A-2B), in accordance with some embodiments of the invention.

In FIGS. 4A, 4B, 4C and 4D, market data parsed from the market data extraction module (e.g., of FIGS. 3A-3B) may be input into this market trend detection module.

Figure 4A:
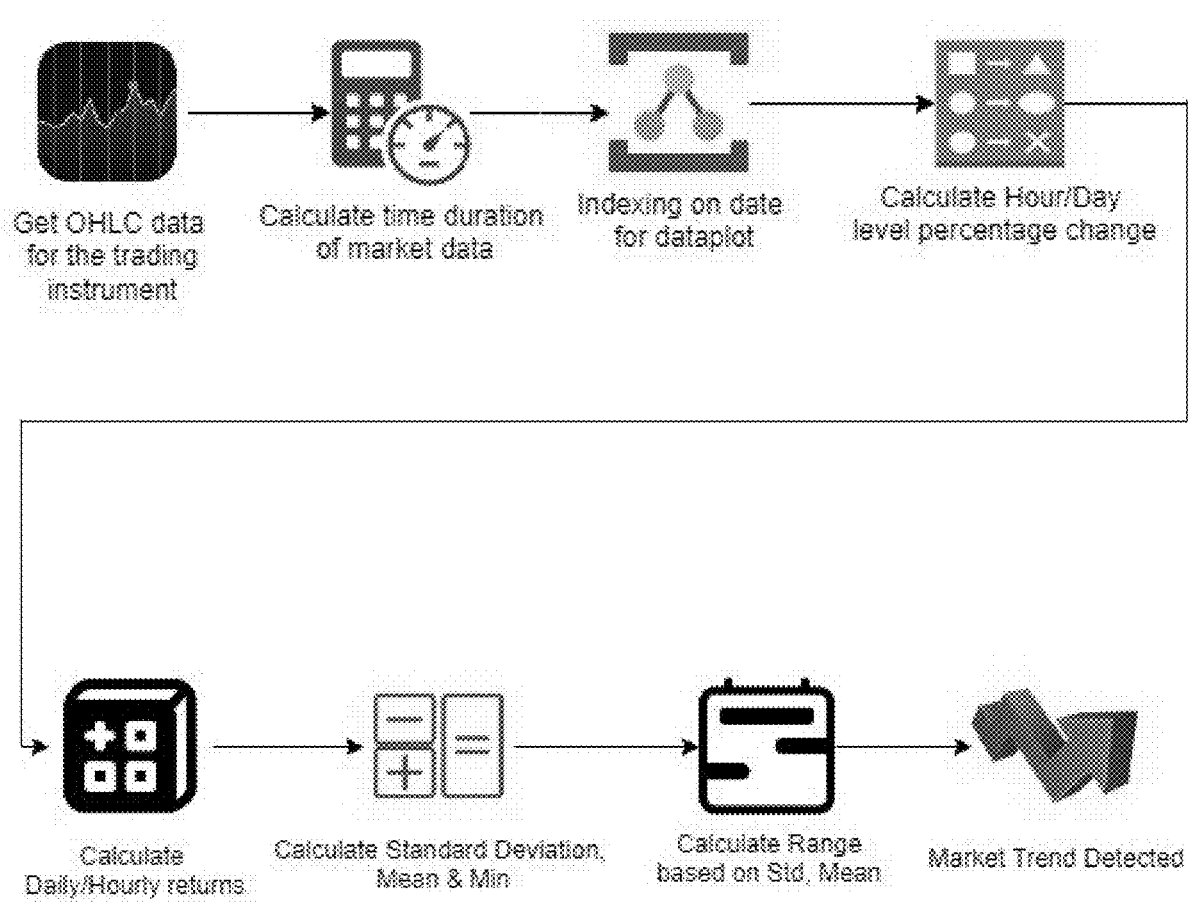
FIGS. 4A-4D are flowcharts of methods executed by a market trend detection module (e.g., of FIGS. 2A-2B), in accordance with some embodiments of the invention.
Figure 4B:
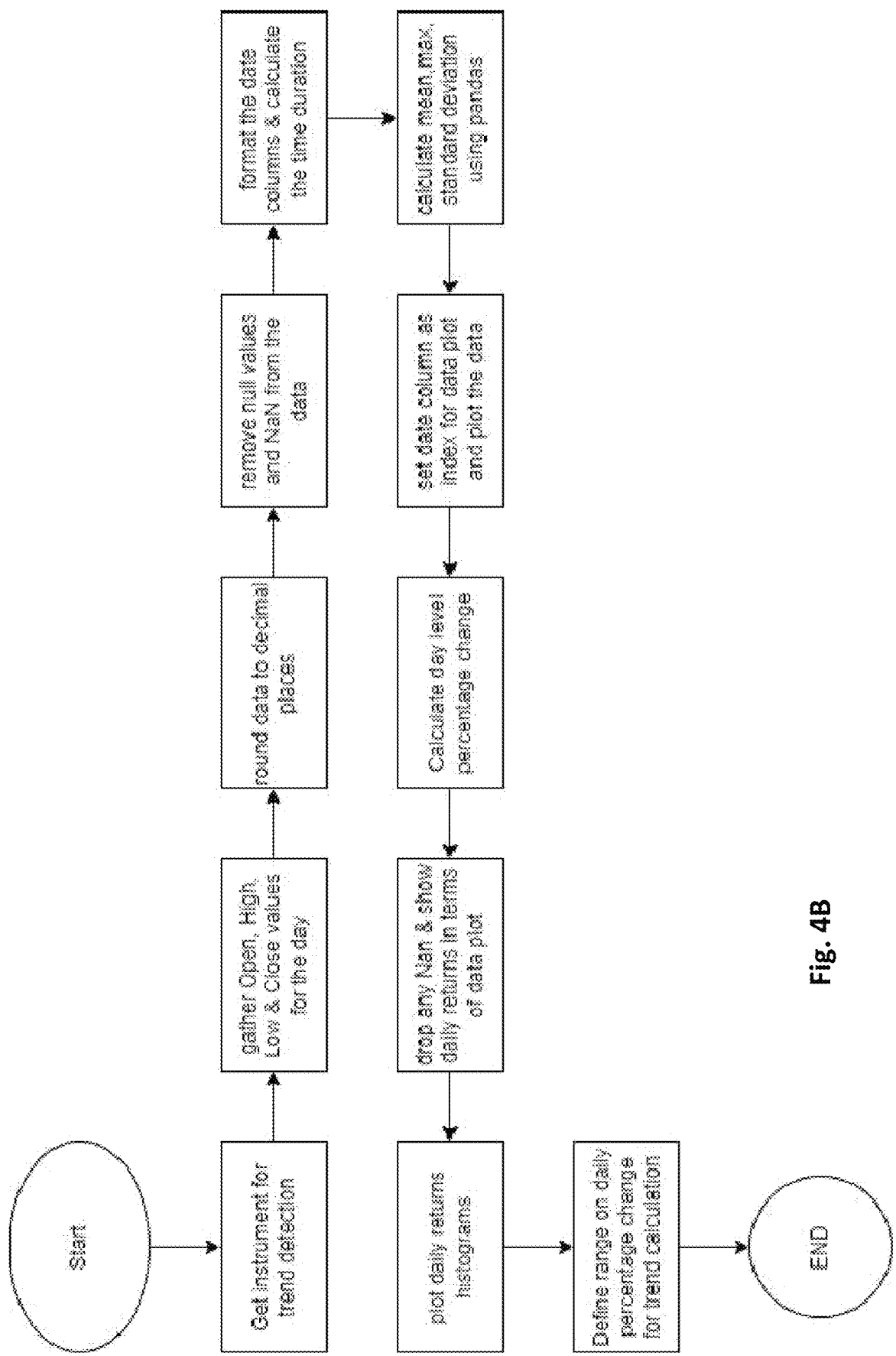
Figure 4C:
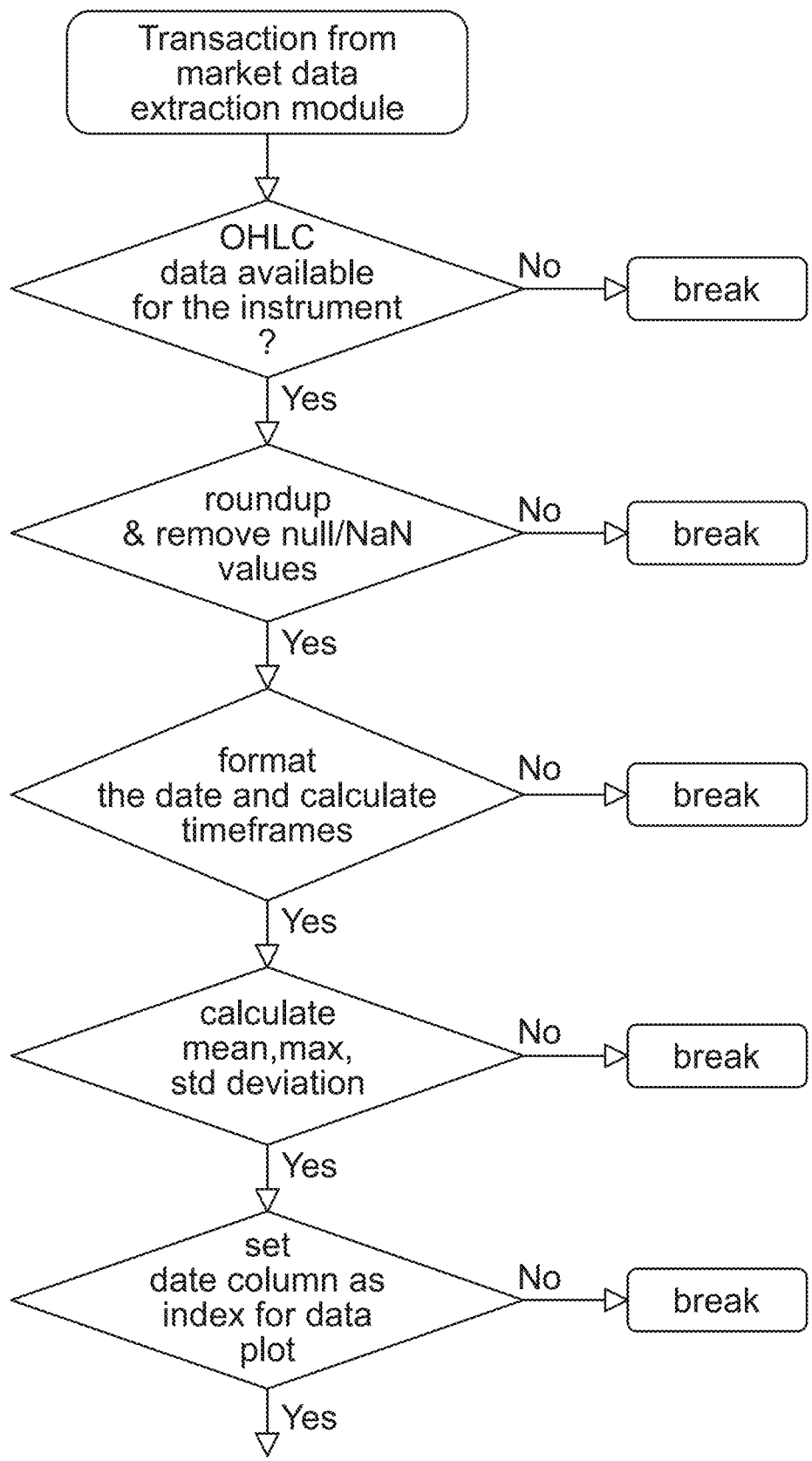
Figure 4D:
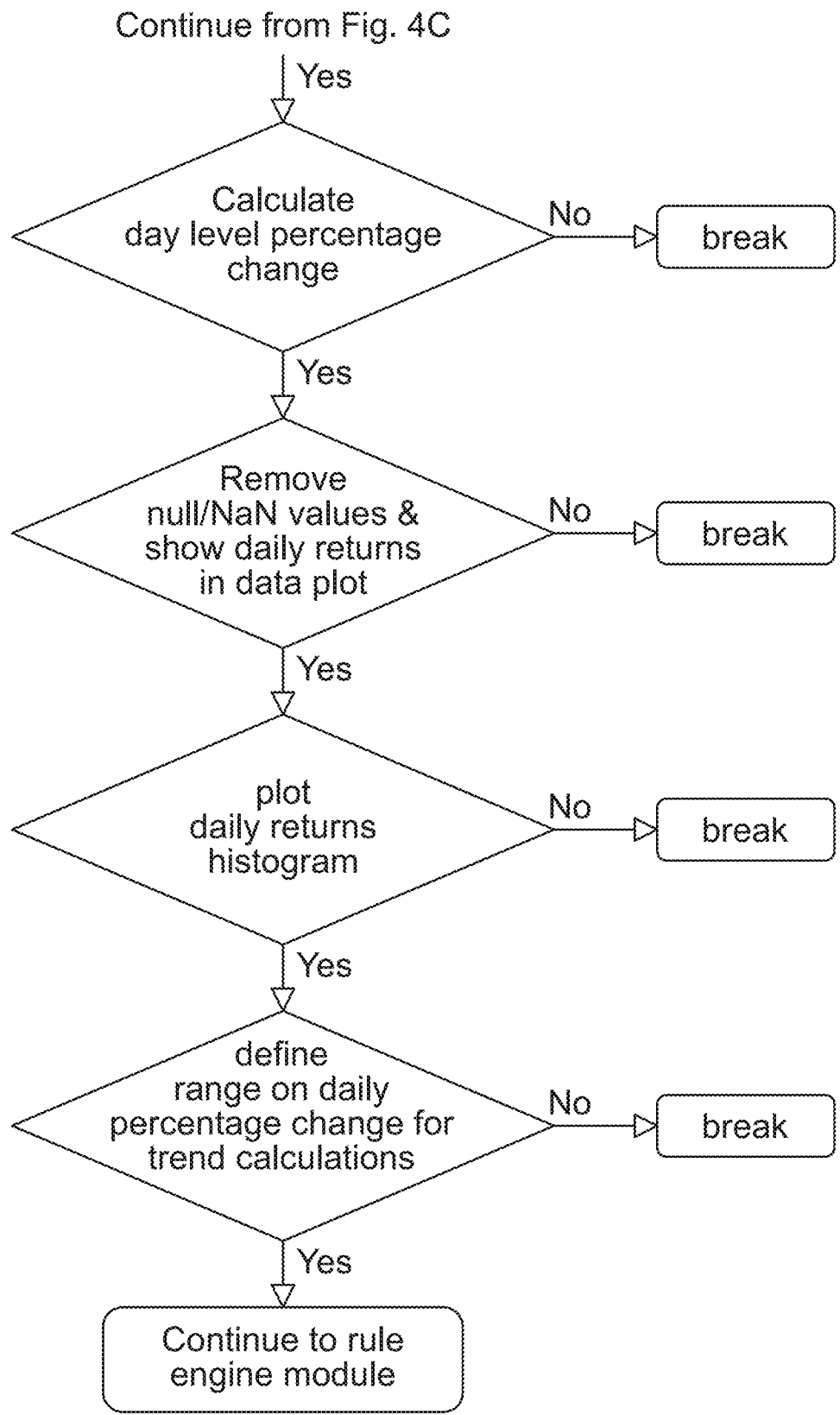

In FIG. 4B, the market trend detection module may retrieve the instrument/ISIN for that market data.

Next, the market trend detection module may collect OHLC (open-high-low-close) values for the day and round of data to approximate decimal values.

The market trend detection module may remove the NaN (Not a Number) and null value, then format date columns and calculation of time duration.

The market trend detection module may compute statistics, such as mean, max, and/or standard deviation, e.g., using Python Panda's library.

The market trend detection module may set the date column as an index for data plotting.

Any NaN values may be checked and dropped again at this step. Daily returns may be displayed in terms of data plot.

Histograms may be plotted on a periodic (e.g., daily) return basis.

To calculate the market trend, the market trend detection module may define the range e.g., by a daily percentage change of values.

FIG. 4B is a flowchart of decisions executed by the market trend detection module.

Figure 5A:
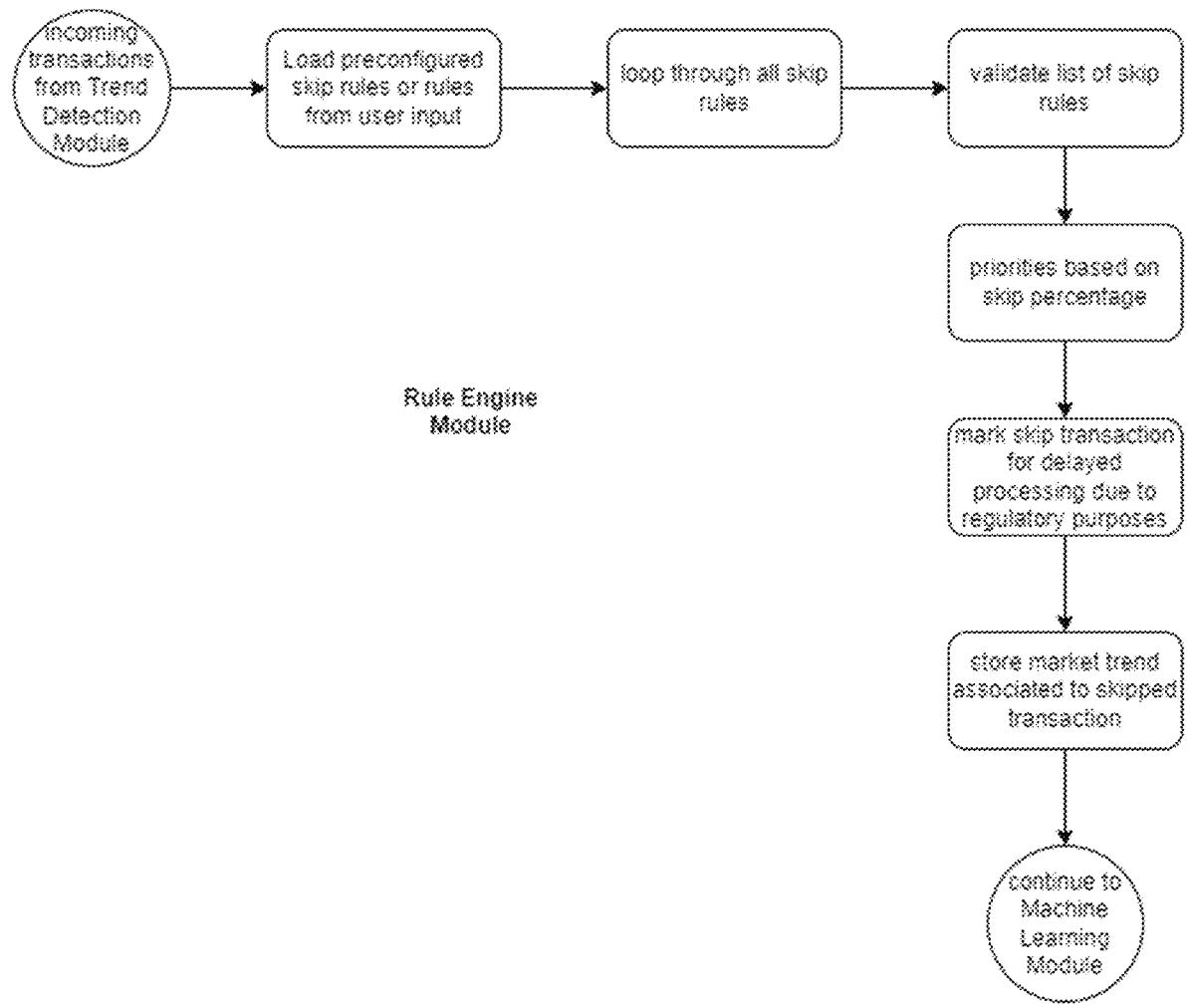
FIGS. 5A-5B are flowcharts of methods executed by a rule engine module (e.g., of FIGS. 2A-2B), in accordance with some embodiments of the invention.
Figure 5B:
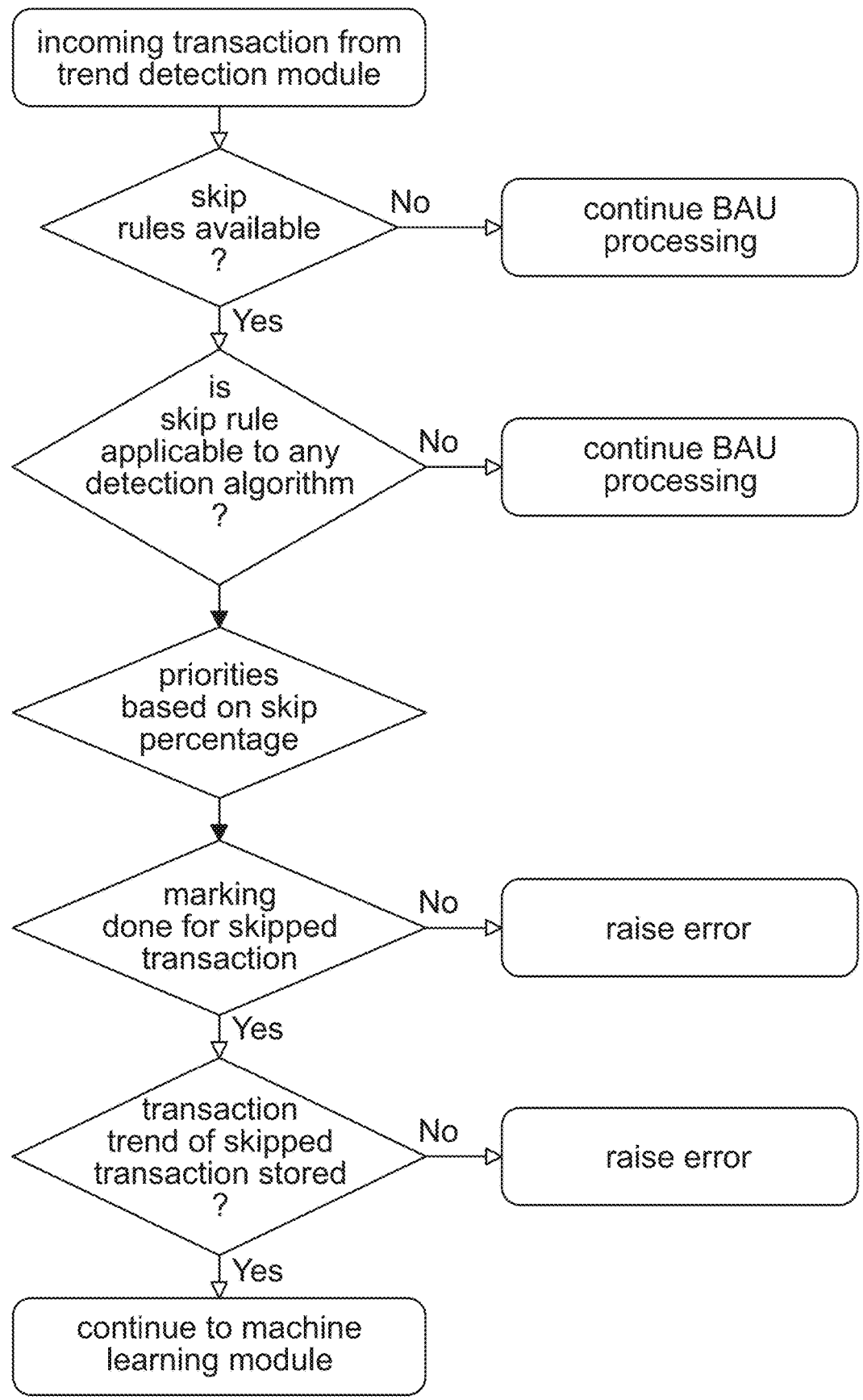
Figure 6A:
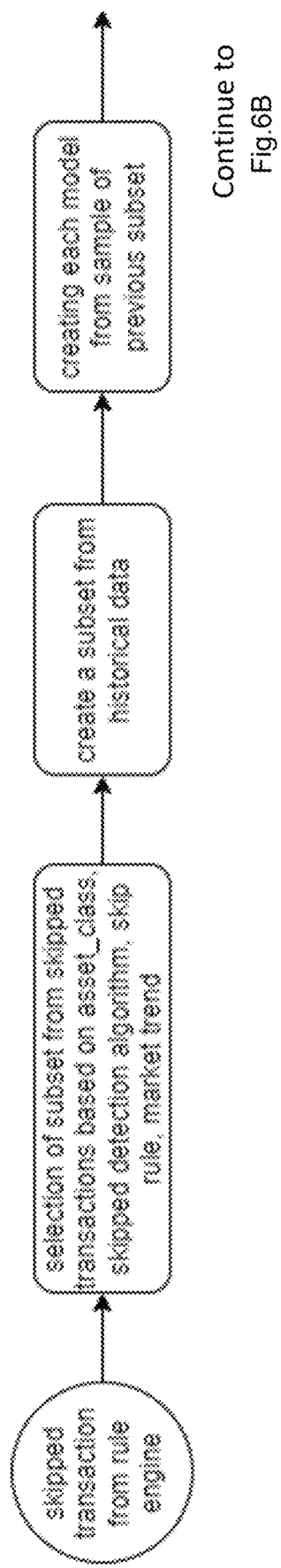
FIGS. 6A-6D are flowcharts of methods executed by a machine learning module (e.g., of FIGS. 2A-2B), in accordance with some embodiments of the invention.
Figure 6B:
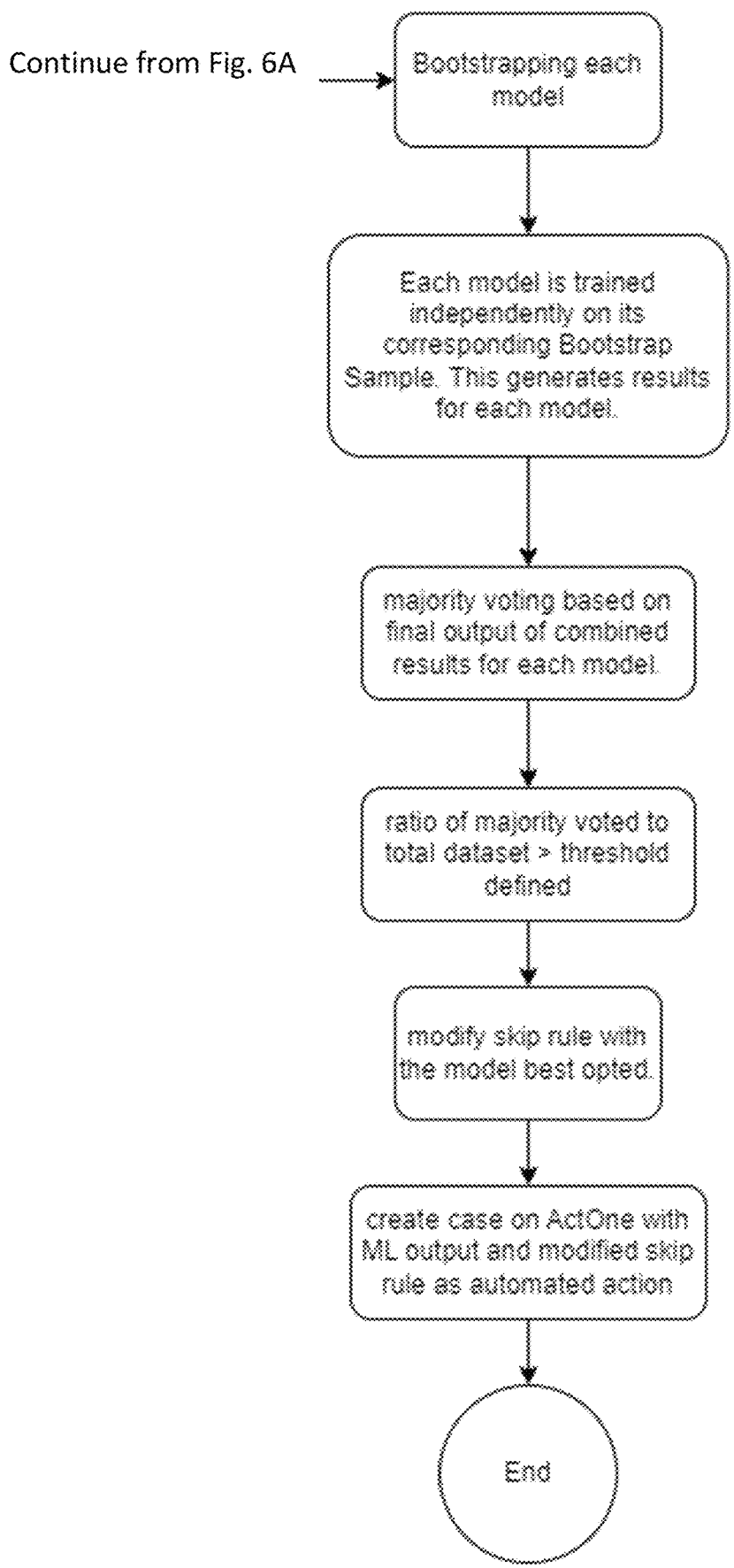
Figure 6C:
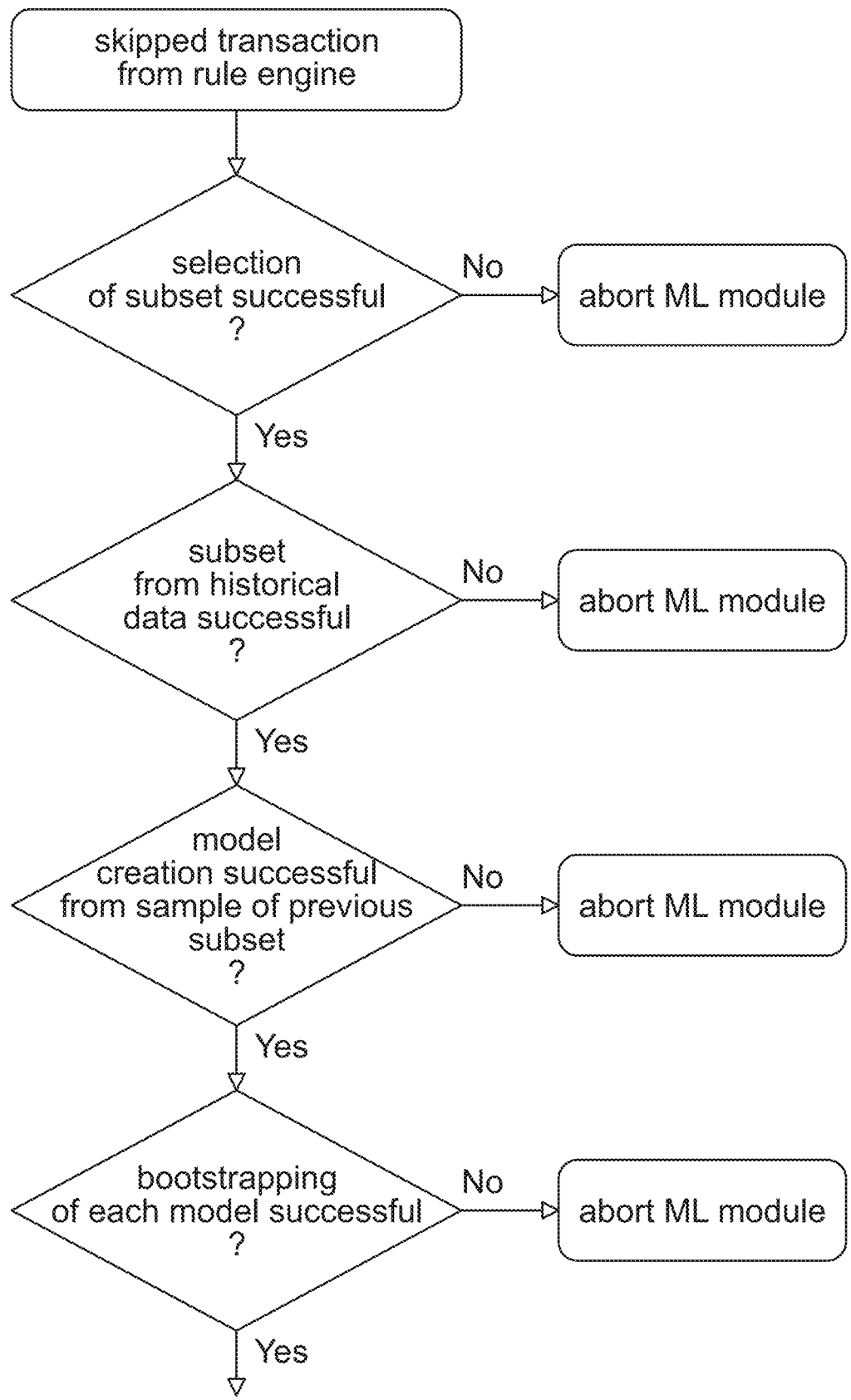
Figure 6D:
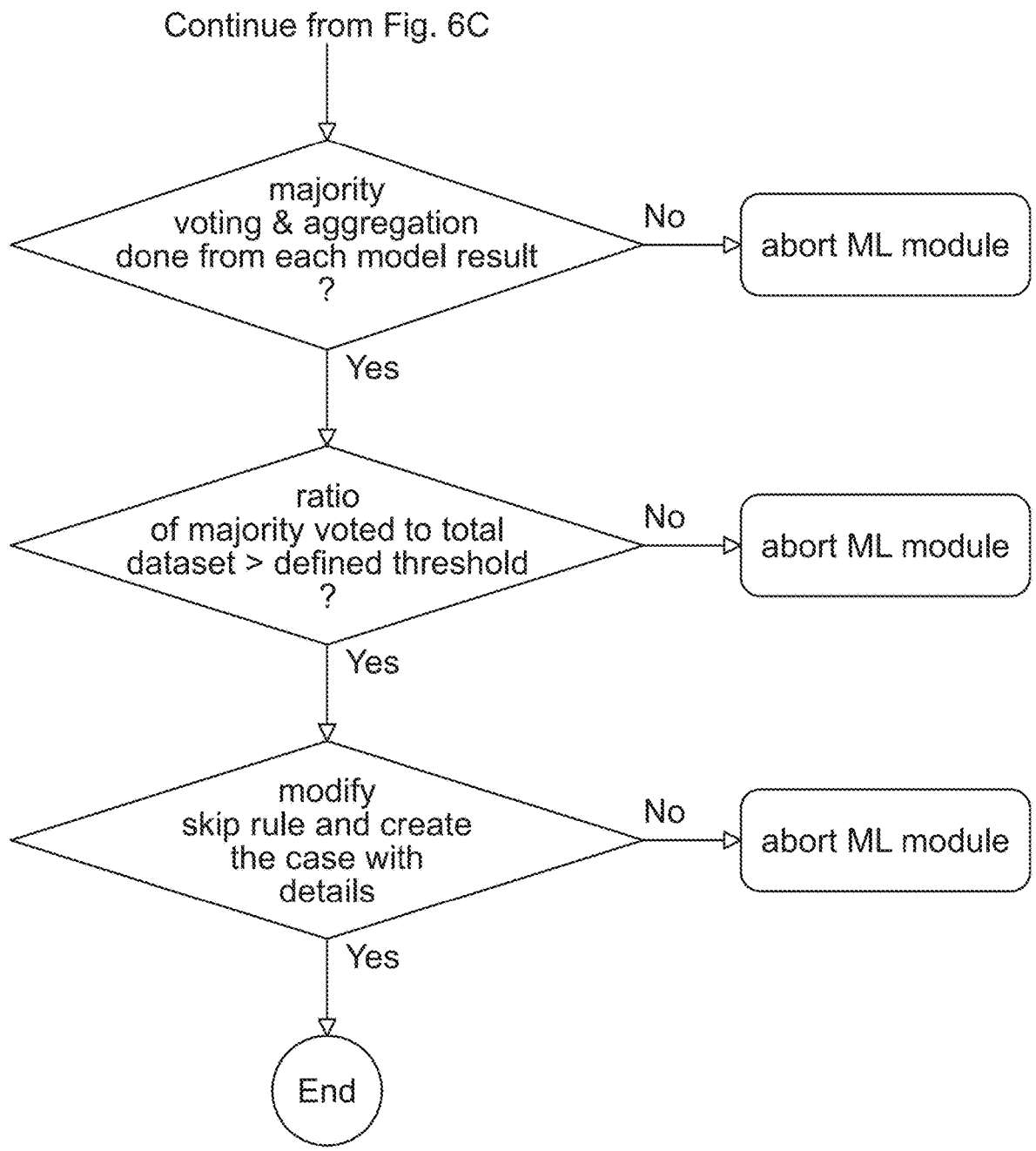

The market data extraction module may output its data to the rule engine module to continue, e.g., as shown in FIGS. 5A-5B.

Reference is made to FIGS. 5A-5B, which are flowcharts of methods executed by a rule engine module (e.g., of FIGS. 2A-2B), in accordance with some embodiments of the invention.

In FIGS. 5A-5B, incoming transactions from the trend detection module may be ingested by the rule engine module and preconfigured skip rules or user-defined rules may be loaded into the system.

Next, the rule engine module may loop through all the skip rules, e.g., sequentially one by one, and based on the priority of skip ness (e.g., degree in which the skip rule is applied, e.g., a highly bullish instrument may be prioritized above an instrument which is mildly bullish) may bypass the detection algorithm wherever the skip rule is valid/applicable.

The rule engine module may then mark all the skipped transactions for delayed processing, for example, to comply with regulatory requirements.

The rule engine module may store all the market trends relevant to those skipped transactions.

The rule engine module may output this data to the machine learning module to continue, e.g., as shown in FIGS. 6A-6D.

API 2 below shows details of an example rule engine API configured to load skip rules stored in the DB:

| (API 2) GET | |
|---|---|
| Description | This API will load skip rules stored in the DB |
| URL | /api/skipRules/loadAllRules |
| Request Type | GET |
| Authentication | User Credentials required |
| Request Example | Request:<br>no request params are required as it loads all rules |
| Response Example | Response: 200 Ok<br>[{<br>  "ruleID": 10,<br>  "ruleName": "SkipFrontRunning",<br>  "ruleCondition": "MarketTrend='Bear Drop' and Quantity>1000 then Front Running='Skip'"<br>},<br>{<br>  "ruleID": 11,<br>  "ruleName": "SkipTailgating",<br>  "ruleCondition": "MarketTrend='Bullish' and Quantity>1000 then Tailgating='Skip'"<br>}] |

Reference is made to FIGS. 6A-6D, which are flowcharts of methods executed by a machine learning module (e.g., of FIGS. 2A-2B), in accordance with some embodiments of the invention.

In FIGS. 6A-6D, incoming transactions from the rule engine module may be ingested by the machine learning module.

Next, the machine learning module may select a subset of transactions based on asset_class, skipped detection algorithm, skip rule, and/or market trend.

The machine learning module may create a subset from historical data and create a model from a sample of the same subset.

Next, the machine learning module may bootstrap each model and train it independently on its corresponding sample.

The machine learning module may take results from each model and extract results based on majority voting and aggregation.

If the majority voted skipped model ratio to total dataset is greater than a predefined threshold, the skip rule may be corrected with a most suitable skip model as an automated action. The majority voted skipped model ratio may be a final output of each bootstrapped model, e.g., based on a subset of transactions based on asset_class, skipped detection algorithm, skip rule, and market trend. In one embodiment, for a classification problem with n classes ($C\_1, C\_2, \ldots, C\_n$) and (B) trees in your random forest, then each tree (b) gives a prediction ($C\_b$). The final prediction (hat $\{C\}$) may be given by the mode of these predictions: $C\hat{}=\text{mode}\{C1,C2,\ldots,CB\}$. In other words, (hat $\{C\}$) may be the class that gets the most votes from the (B) trees. A tie vote may be decided e.g., randomly or based on the highest class probability estimates from the trees.

Embodiments of the invention may create a case based on output of the machine learning model and an audit of the modified skipped rule as an automated action.

API 3 below shows details of an example machine learning API configured to store machine learning module results in DB:

| (API 3) POST | |
|---|---|
| Description | This API will store machine learning module results in DB. |
| URL | /api/saveMLResultsInDB |
| Request Type | POST |
| Authentication | Token required |
| Request Example | Request:<br>{<br>    "MachineLearningDetails": {<br>        "instrument": "AMZN",<br>        "instrumentType": "XREFISIN",<br>        "skipRule": " MarketTrend='Bear Drop' and Quantity>1000 then Front Running='Skip'",<br>        "predictedTrend": "Bullish"<br>    }<br>} |
| Response Example | Response: 200 Ok<br>{<br>  "Result": [ML details stored successfully]<br>} |

APIs 1-3 may use the below example data structures:
/api/marketData/GetOHLCData (GET API 1):

| Request |
|---|
| Instrument: String<br>InstrumentType: String<br>BusinessDate: String |
| Response |
| ListingId: Integer<br>BusinessDate: Date<br>TodayOpen: Double<br>TodayClose: Double<br>PrevClose: Double<br>Adv30: Double<br>TodayVolume: Double |

| -continued |
|---|
| AuctionPrice: Double<br>AuctionQty: Double<br>PrevDayVolume: Double<br>High: Double<br>Low: Double<br>VwapPrice: Double |

/api/skipRules/loadAllRules (GET API 2):

| SkipRule (Response) |
|---|
| RuleID: Integer<br>RuleName: String<br>RuleCondition: String |

/api/saveMLResultsInDB (POST API 3):

| MachineLearningDetails (Request) |
|---|
| Instrument: String<br>InstrumentType: String<br>predictedTrend: String<br>skipRule: String |

Simulations results:

Reference is made to FIGS. 7-10, which are example simulation results generated by data structures (e.g., of FIGS. 2A-6D), in accordance with some embodiments of the invention.

Figure 7:
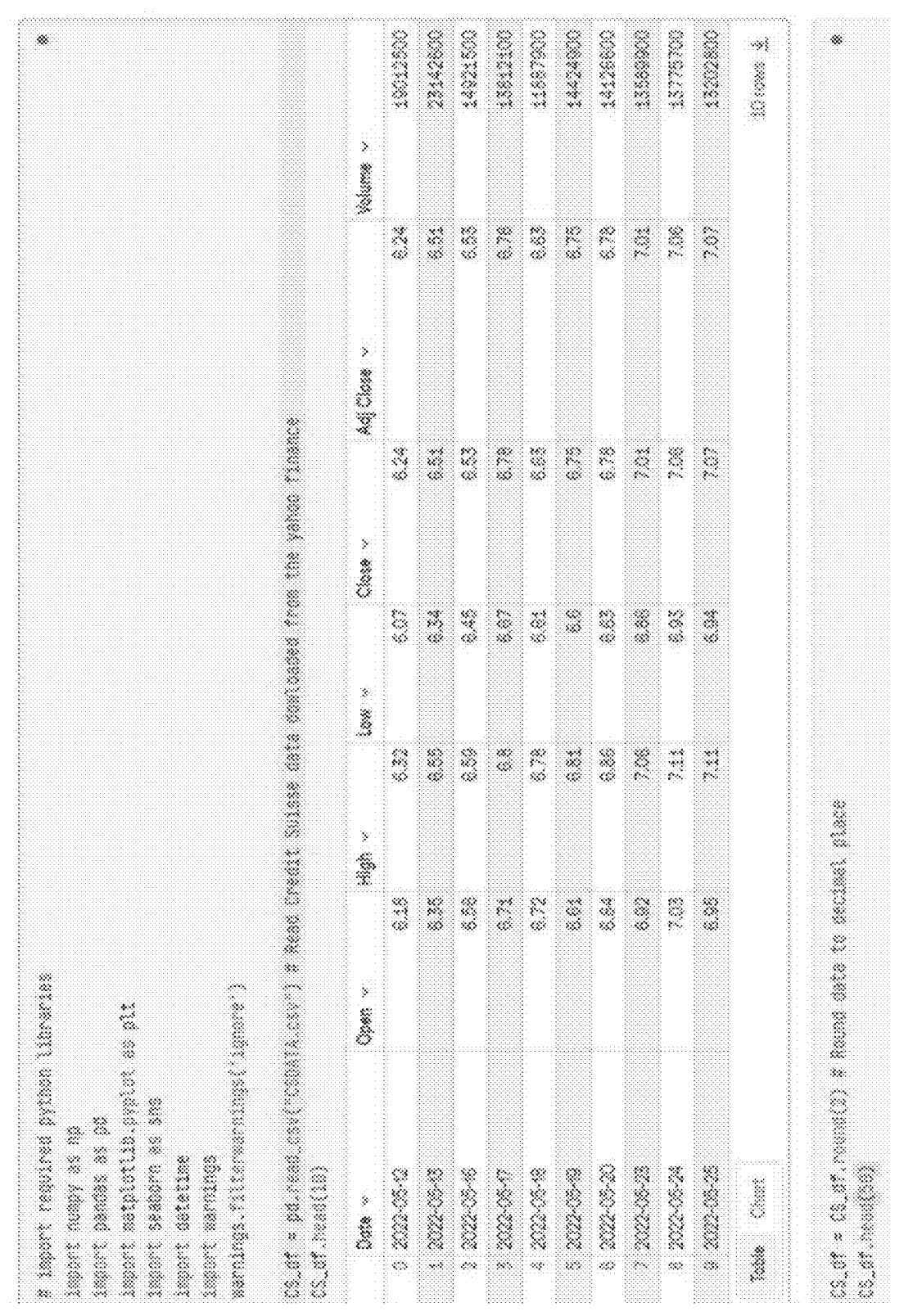

FIG. 7 illustrates a programmable user interface depicting example calculations of the global market trend from instrument market data, in accordance with an embodiment of the invention.

Figure 8:
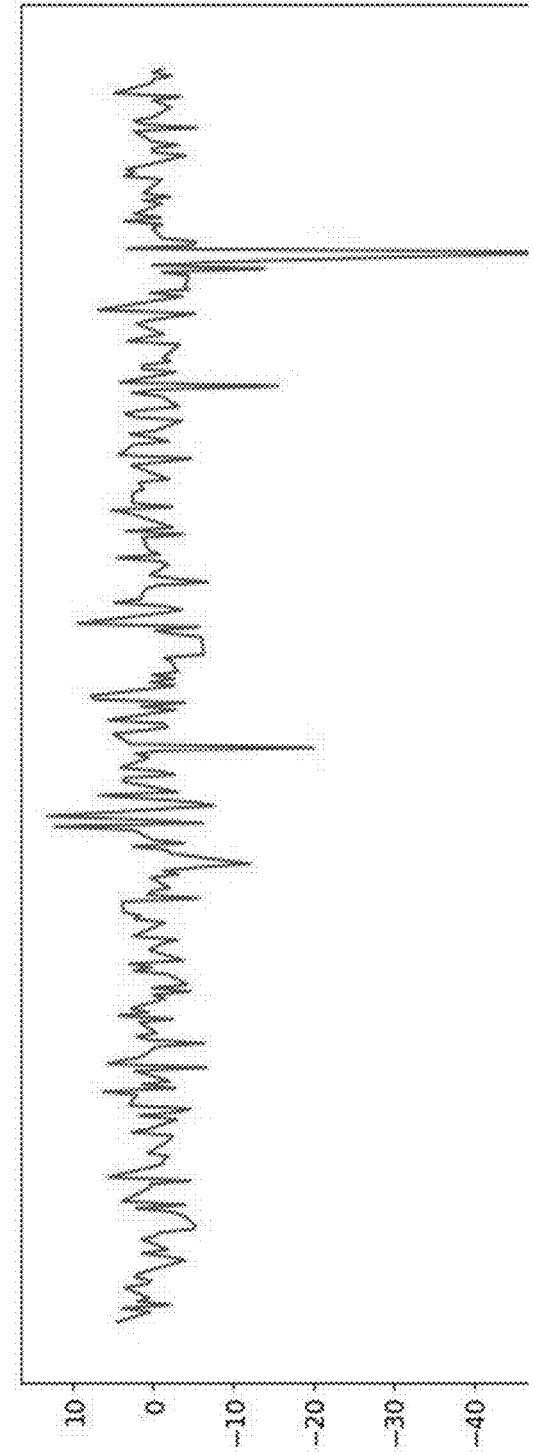

FIG. 8 illustrates a programmable user interface depicting example daily returns in terms of data plot, in accordance with an embodiment of the invention.

Figure 9:
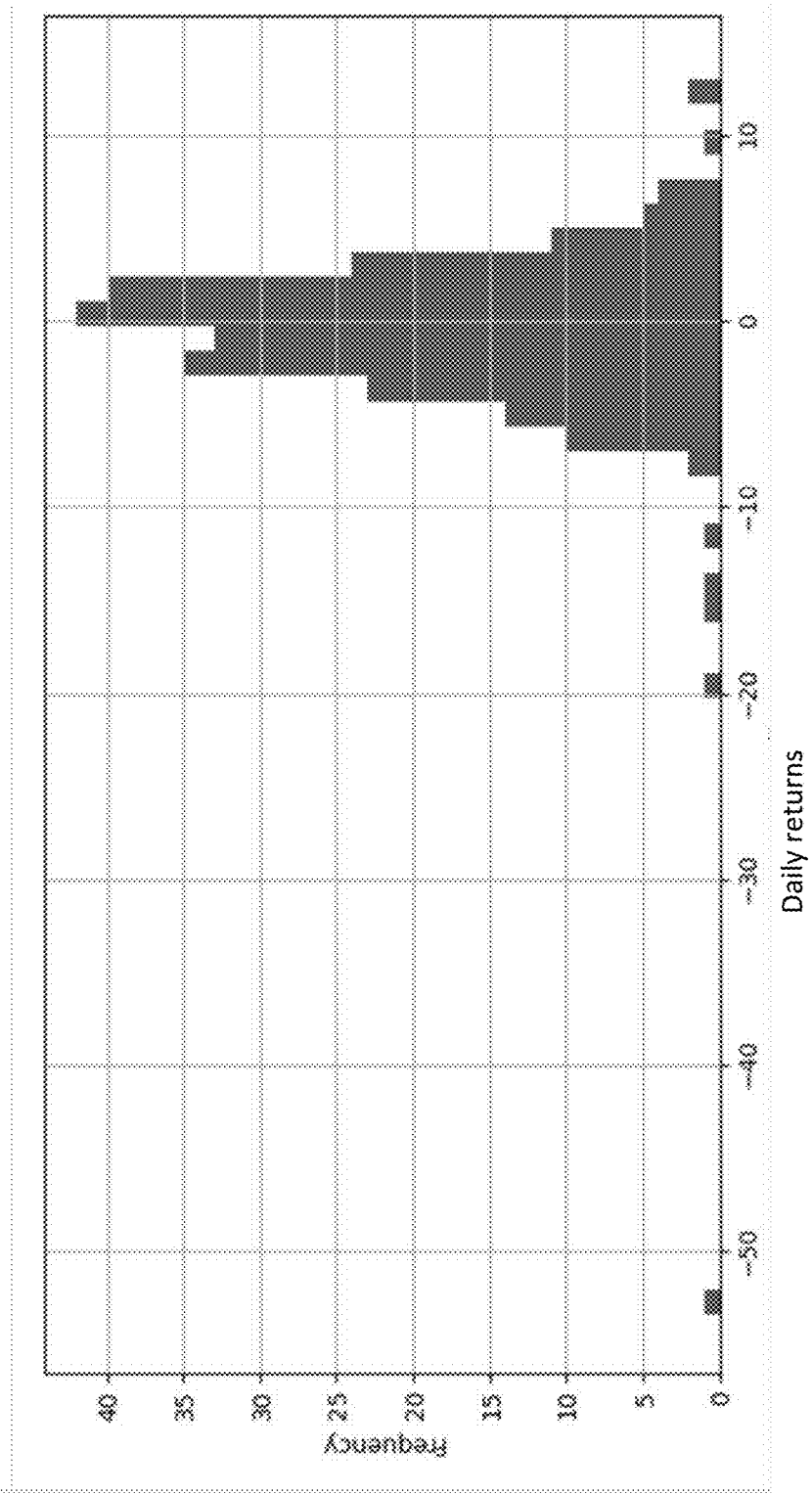

FIG. 9 illustrates a programmable user interface depicting an example daily returns histogram with standard deviation and mean, in accordance with an embodiment of the invention.

FIG. 10 illustrates a programmable user interface depicting an example trend calculated for the instrument with the percentage of skip ness defined (e.g., as a Gaussian curve), in accordance with an embodiment of the invention.

Additionally or alternatively, other programmable user interfaces may be used.

Embodiments of the invention may provide automated compliance detection and enforcement actions, for example, as follows.

Transactions may be processed in order in a priority queue based on the skip percentage defined for the instrument. Whereas a single skip rule can be applied uniformly to multiple traded instruments (e.g., Stock A, Stock B and Stock C), in some embodiments the traded instruments can have different "skip ness" or "skip percentage" to apply different skip rules to individual stocks to account for their different individual behavior. For example, if Stock A is bearish and its skip ness is 50% but Stock B is bearish with skip ness of 90% then transactions from Stock B are more likely to produce correct results than Stock A as their trend nearly matches with the skip rule defined. Prioritizing Stock B transactions over Stock A will provide better efficiency. In one example, a stock skip rule accounting for individual stock behavior may be: 'Market Trend='Bear Drop' and SkipPercentage>90 and Quantity>1000 then Front Running='Skip', Wash Trades='Skip ". This skip rule applied to two transactions, one with skip % 50 and one with skip % 75, will cause the transaction with 50% skip ness to be processed before the transaction with 75% skip ness.

If the majority voted skipped model ratio to the total dataset is greater than the defined threshold then the skip rule may be corrected with the most suitable skip model, e.g., as an automated action taken on trades.

Embodiments of the invention may create the case of output from machine learning and modify skipped rule as an automated action taken on trades.

As an automated action for skipped transactions, those transactions may be marked as skipped (e.g., for regulatory purposes) and analytics thereon may be executed during non-business hours. This ensures all transactions are scanned through an analytical model in an intelligent and resourceful way.

Embodiments of the invention may store the market trends of transactions for which the pattern is unknown and pass those transactions to a (e.g., random forest) machine learning algorithm

EXAMPLE TEST RESULTS

Executing the market trend algorithm for all transactions, the skip rule may be applied by the analytical engine based on the market trend and additional rules to increase the speed and accuracy of compliance testing. In one example, the front running algorithm is skipped if the market trend is 'Bear Drop' having a quantity greater than e.g. 1000. For example, Skip Rule: MarketTrend='Bear Drop' and Quantity>1000 then Front Running='Skip'.

In test simulations, 36% of transactions from a market extracted dataset were found to follow the market trend 'Bear Drop'. For simplicity, if one analytical model is executed, this embodiment reduces transaction testing by 36% in computational time.

Reference is made to FIGS. 11-14, which are example user-controllable interfaces for a compliance case, in accordance with some embodiments of the invention.

Figure 11:
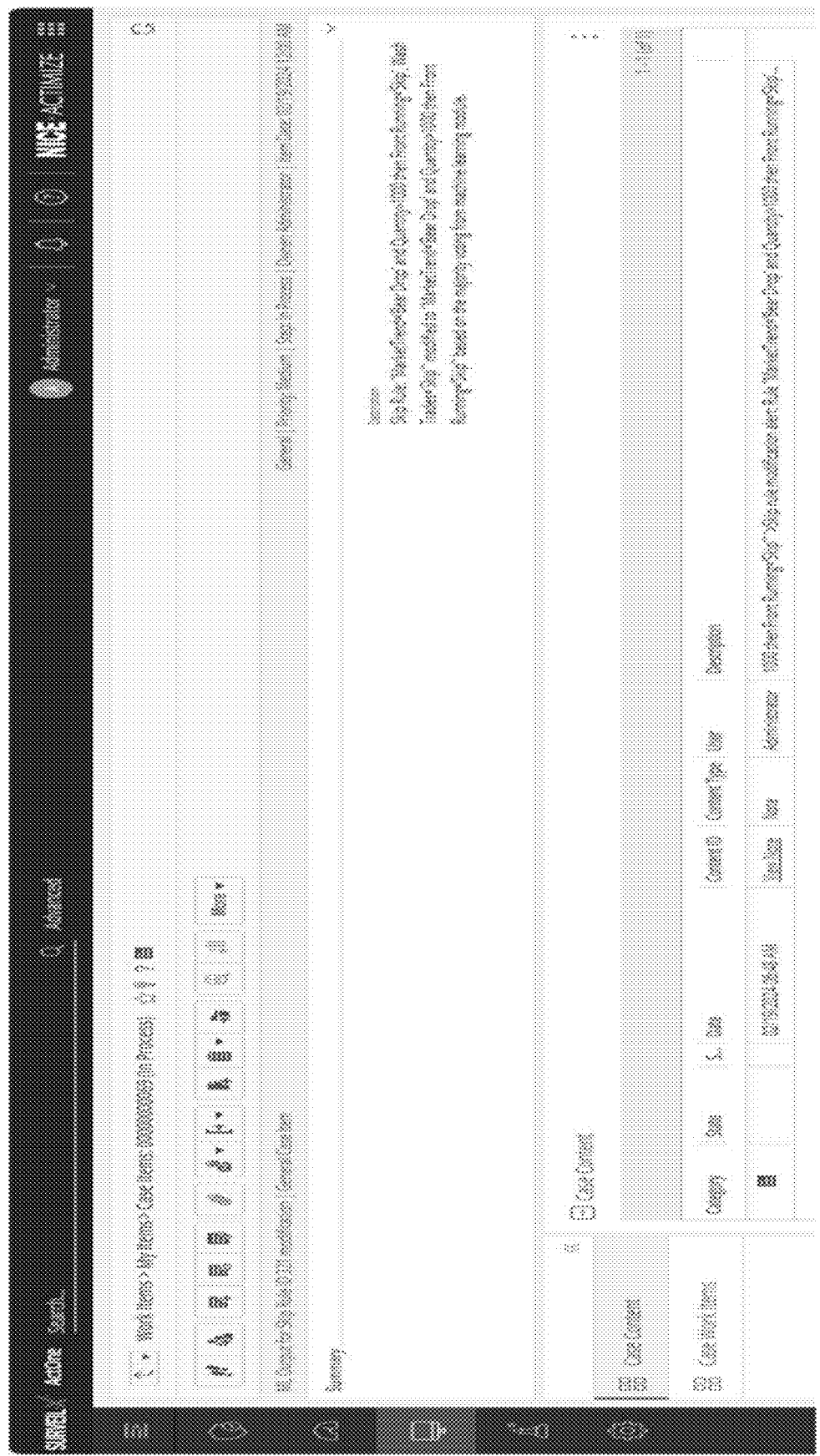

FIG. 11 illustrates a user-controllable interface for a compliance case item containing skip rule modification details created as automated action, in accordance with an embodiment of the invention.

Figure 12:
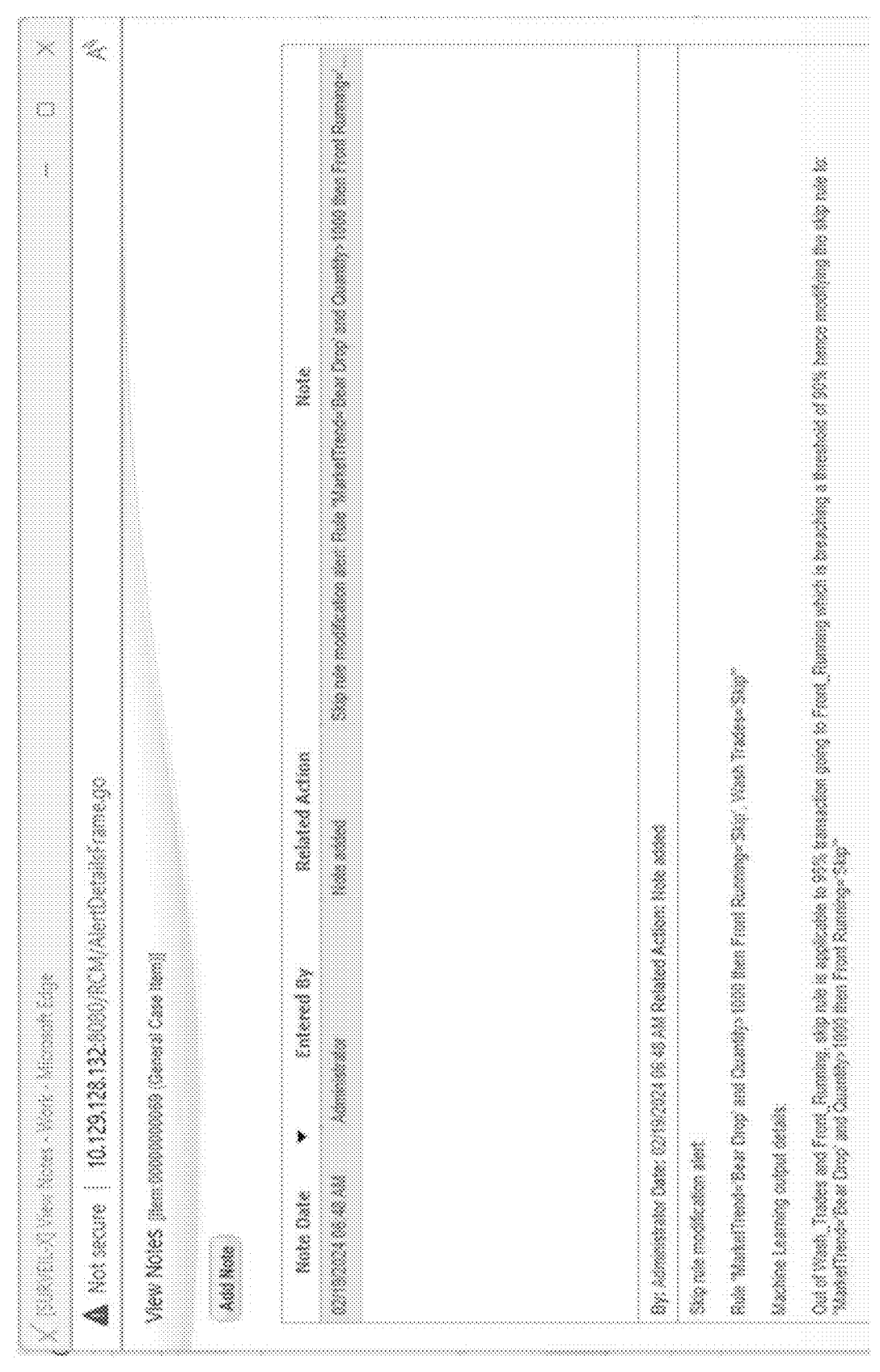

FIG. 12 illustrates a user-controllable interface depicting details of the compliance case item of FIG. 11, in accordance with an embodiment of the invention.

Figure 13:
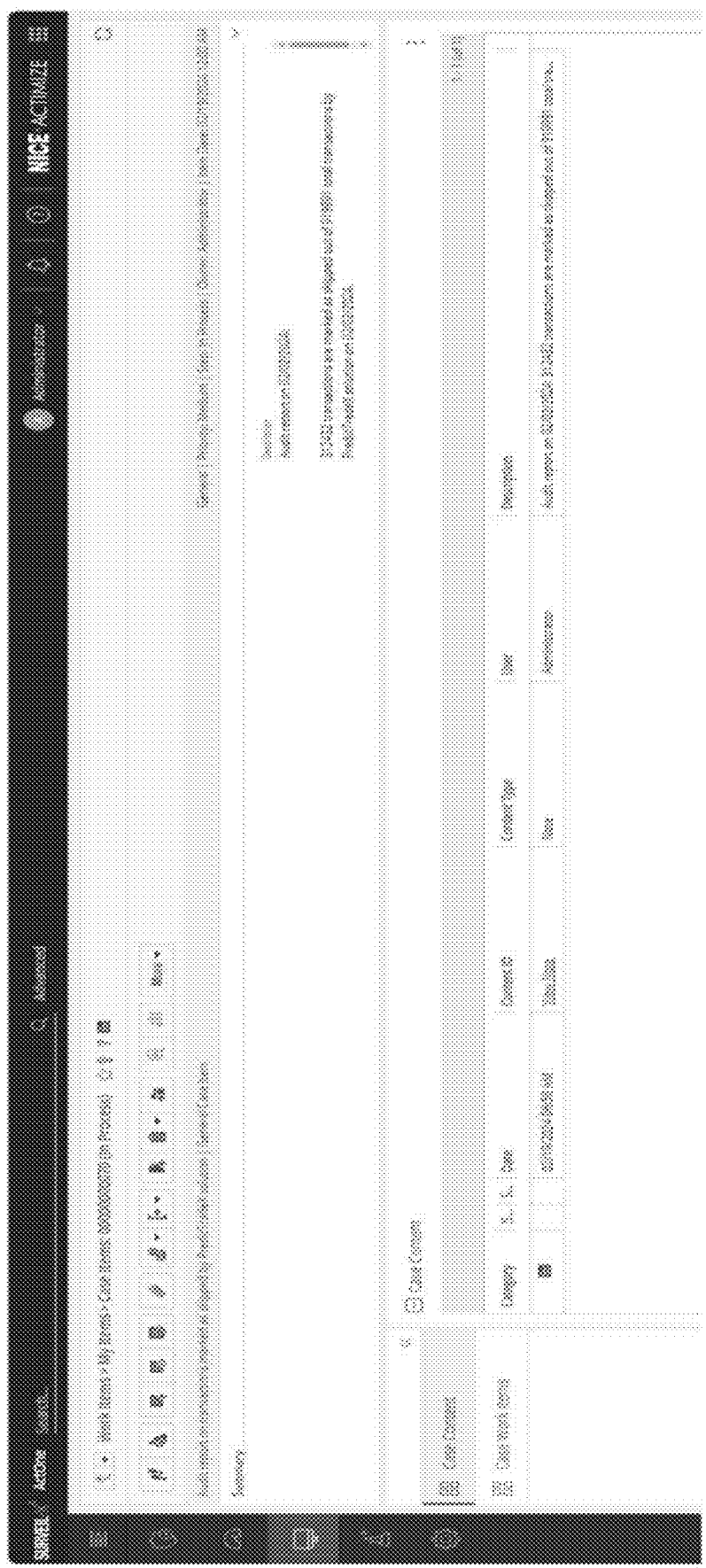

FIG. 13 illustrates a user-controllable interface for a compliance case item created containing a report of a transaction marked as skipped, for example, for audit purposes, in accordance with an embodiment of the invention.

FIG. 14 illustrates a user-controllable interface depicting details of the compliance case item of FIG. 13, in accordance with an embodiment of the invention.

Figure 15:
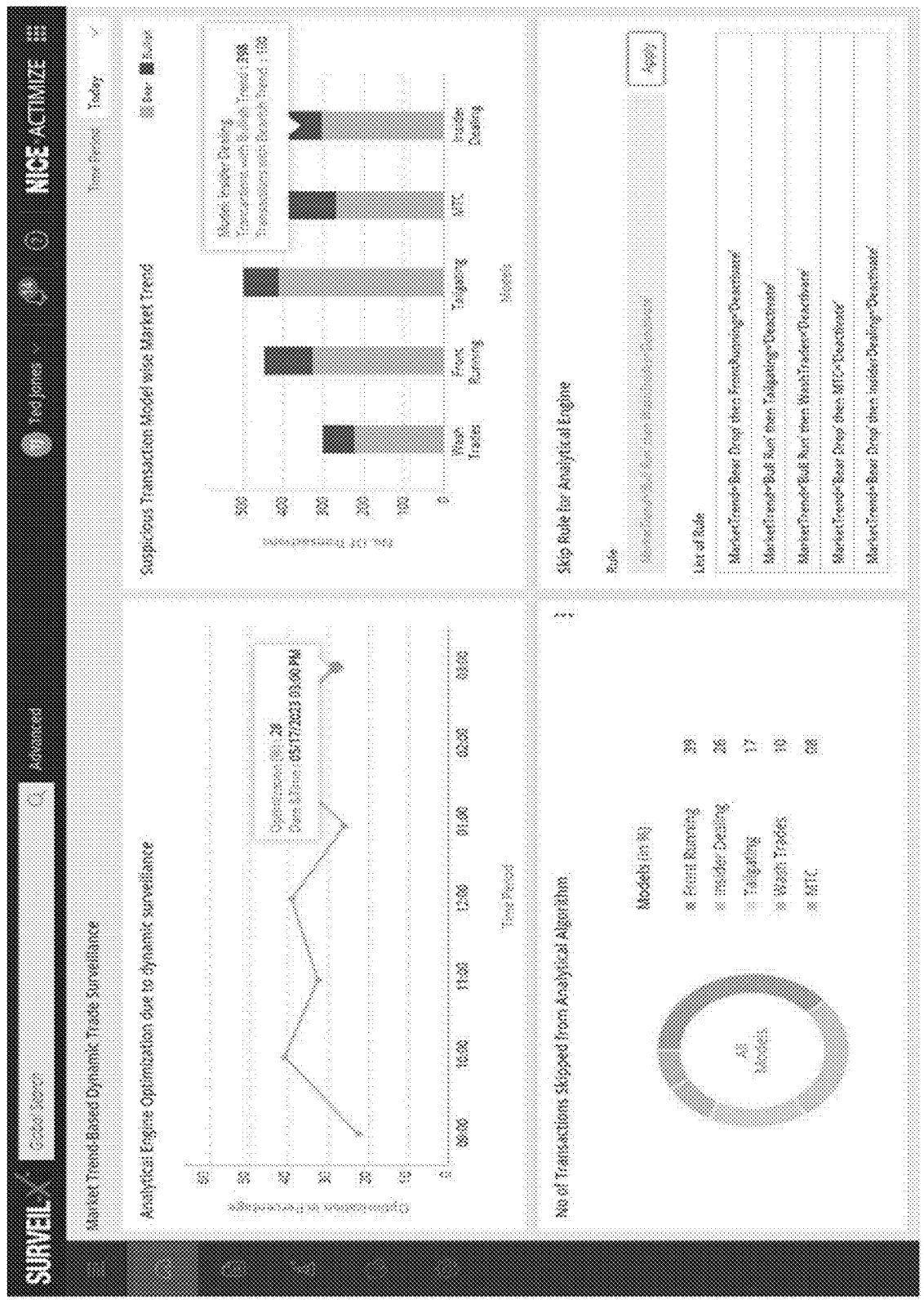
FIG. 15 schematically illustrates an example user interface for a compliance case management, in accordance with an embodiment of the invention.

Reference is made to FIG. 15, which schematically illustrates an example user interface for a compliance case management, in accordance with an embodiment of the invention.

In FIG. 15, the top left corner of the user-interface depicts an optimization (percentage speed-up of computational time) achieved due to the skipped transactions from detection algorithms. The top right corner depicts the categorization of transactions based on trends per detection algorithm. The bottom left corner depicts the distribution of skipped transactions across different detection algorithms. The bottom right corner depicts the skip rules applied for the algorithms. Skip rules may be added or deleted from this section.

Figure 16:
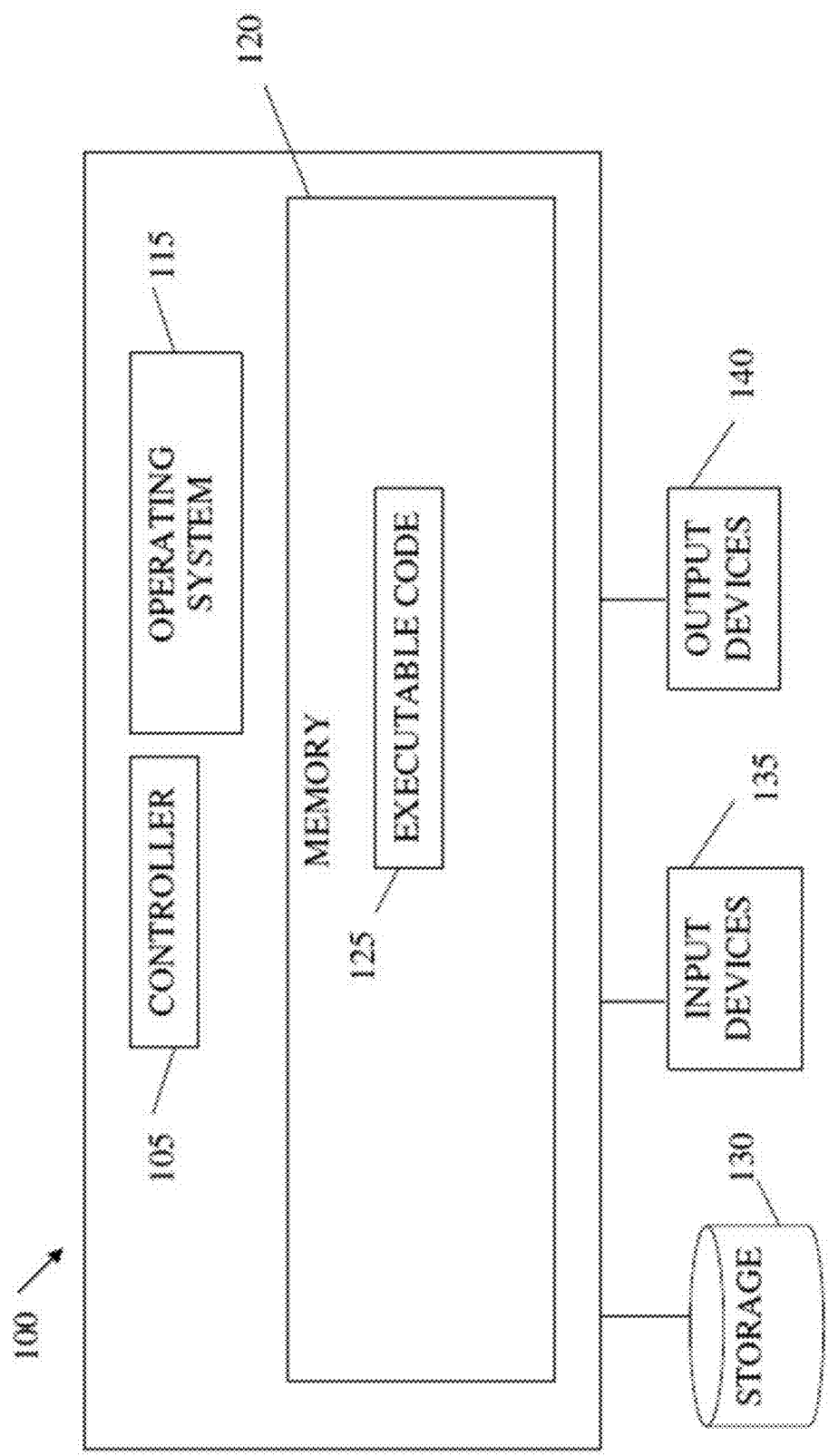
FIG. 16 schematically illustrates an exemplary system for accelerated compliance testing for real-time detection of suspicious transactions, in accordance with some embodiments of the invention.

Reference is made to FIG. 16, which schematically illustrates an exemplary system for accelerated compliance testing for real-time detection of suspicious transactions, in accordance with some embodiments of the invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system. Each data structure, programming code, algorithm, and/or equipment discussed herein may be or include, or may be executed by, a computing device such as included in FIG. 16, although various units among these may be combined into one computing device.

Operating system 115 may be or may include code to perform tasks involving coordination, scheduling, arbitration, or managing operation of computing device 100, for example, automated real-time compliance testing of transaction streams. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as low-level action data, output data, etc.

Executable code 125 may be any application, program, process, task or script. Executable code 125 may be executed by controller 105 possibly under control of operating system 115. For example, executable code 125 may be one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a Compact Disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices, which may be operated by for example a compliance officer. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 17:
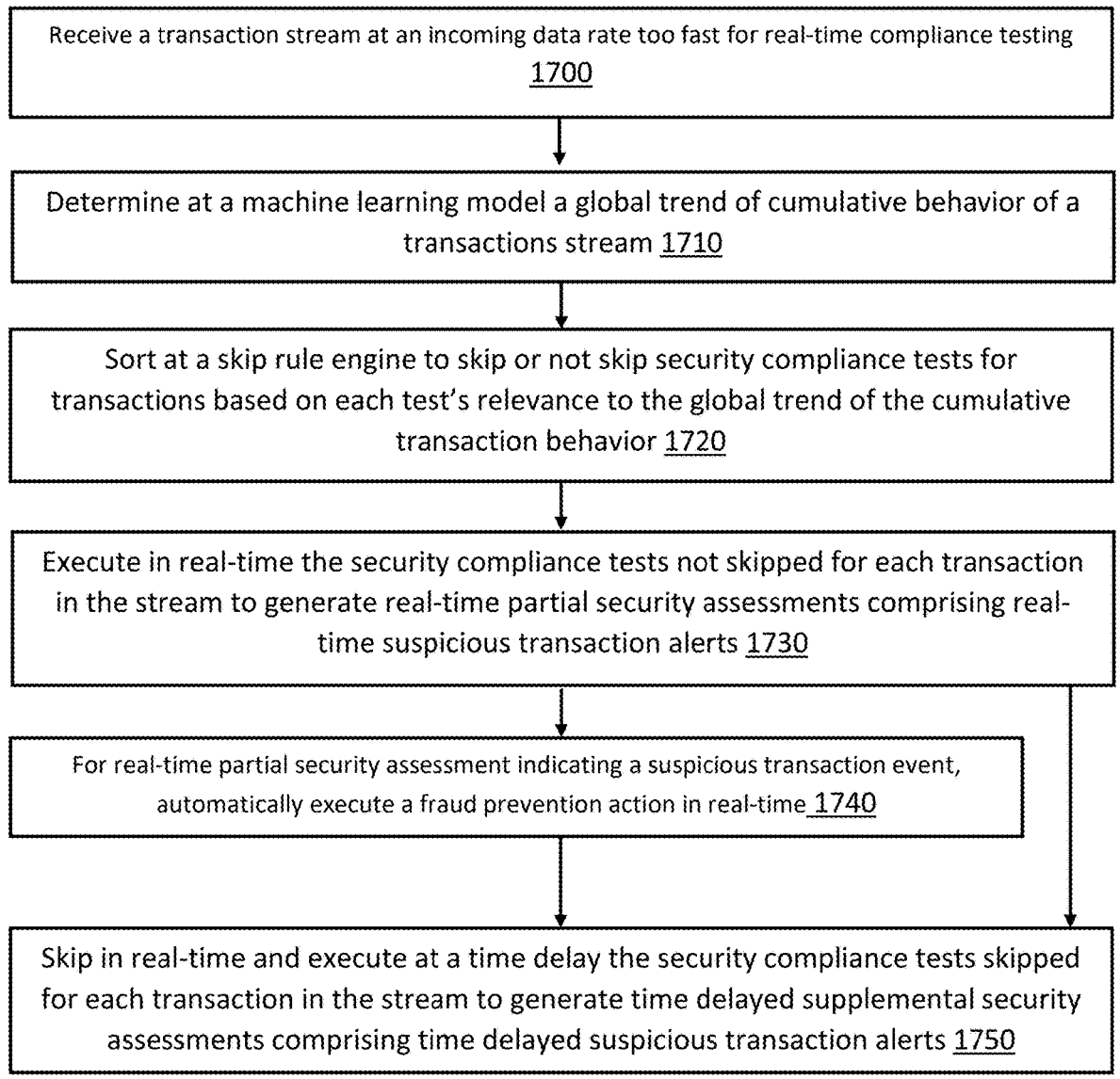
FIG. 17 is a flowchart of a method for accelerated compliance testing for real-time detection of suspicious transactions, in accordance with some embodiments of the invention.

Reference is made to FIG. 17, which is a flowchart of a method for accelerated compliance testing for real-time detection of suspicious transactions, in accordance with some embodiments of the invention. Operations described in reference to FIG. 17 may be executed using devices described in reference to FIG. 16 e.g. device 100 using one or more processor(s) (e.g., controller 105 of FIG. 16).

In operation 1700, one or more processor(s) may receive a stream of transactions received at an incoming data rate exceeding computational capability of a designated network of computers to execute a complete set of a plurality of security compliance tests thereon in real-time. The computational limit may be fixed or dynamically adjusted and imposed by a resource scheduler.

In operation 1710, one or more processor(s) may determine, using a machine learning model, a global trend of cumulative transaction behavior based on all, a majority or a random or pseudo-randomly selected representative subset, of the stream of transactions. The global trend may include any measure of cumulative behavior relevant to an entire marketplace, instrument, or account, such as for example, a bullish market, a bearish market, up/down/sideways trends, consumer sentiment, consumer confidence, market volatility, etc.

In operation 1720, one or more processor(s) may sort at a skip rule engine, for each transaction in the stream, to skip or not skip each of the complete set of security compliance tests based on each test's relevance to the global trend of the cumulative transaction behavior.

In some embodiments, the skip rule engine may be permanently active (executing operation 1720). Alternatively, the skip rule engine may toggle between an active state (executing operation 1720) and inactive states (not executing (skipping) operation 1720). For example, one or more processor(s) may monitor the incoming data rate and execute the skip rule engine (operation 1720) when the incoming data rate exceeds, and not executing the skip rule engine (skip operation 1720) when the incoming data rate does not exceed, the computational capability of a designated network of computers to execute the complete set of the plurality of security compliance tests thereon in real-time. The skip rule engine, with itself consumes computational resources may thus only be activated when the incoming transmission stream is too fast to keep up with real-time compliance testing, and may be inactive (saving skip engine power consumption) when the incoming transmission stream is below that real-time compliance testing threshold.

In some embodiments, the skip rule engine sorts each of the complete set of security compliance tests into two classes to skip tests associated with a relatively high, above threshold or maximum relevance to the global trend and to not skip tests associated with a relatively low, below threshold or minimum relevance to the global trend. In some embodiments, the skip rule engine sorts each of the complete set of security compliance tests into an integer number of three or more classes ordered based on respective degrees of relevance to the global trend, wherein each class of tests is executed sequentially in the order of the class. In some embodiments, the skip rule engine individually sorts each of the complete set of security compliance tests according to an ordered rank of the test's relevance to the global trend or individual instrument trend and executes each test sequentially in the rank order of the test.

In one example, the skip rule engine may sort to skip a front-running security compliance test based on the test's irrelevance when the transactions to be tested occur during a bearish global trend of the cumulative behavior of the stream of transactions. In another example, the skip rule engine may sort to skip a tailgating security compliance test based on the test's irrelevance when the transactions to be tested occur during a bullish global trend of the cumulative behavior of the stream of transactions. Other skip criteria may be used and the skip rule engine may sort based on additional criteria (in addition to relevance to the global trend) such as, transaction quantity, transaction volume, skip percentage, and/or fraud history.

In some embodiments, the skip rule engine may be dynamically updated by a machine learning model to adjust the skip conditions to skip security compliance tests. The machine learning model may be trained based on each test's verified historical relevance to the global trend.

In operation 1730, one or more processor(s) may execute in real-time the security compliance tests not skipped for each transaction in the stream to generate real-time partial security assessments therefore comprising real-time suspicious transaction alerts. If a suspicious transaction event is detected, one or more processor(s) may proceed to operation 1740; otherwise one or more processor(s) may proceed to operation 1750.

In operation 1740, in response to receiving a real-time partial security assessment indicating a suspicious transaction event, one or more processor(s) may automatically execute a fraud prevention action. A fraud prevention action may include any action to pre-emptively cancel, delay, deter, escalate compliance testing or minimize the impact of a transaction before it occurs when the transaction is detected or predicted to be fraudulent, suspicious or anomalous. A fraud prevention action may include, for example, cancelling or delaying the transaction before it is executed, predicting future downstream fraudulent transactions associated with the transaction before they are committed, altering the security requirements associated with executing the transaction, quarantining funds or accounts associated with the transaction, sending fraud detection alerts to fraud enforcement, etc. In one example, the one or more processor(s), having previously (e.g., prior to operation 1700) received an instruction to trigger initiating a transaction program for the transaction may subsequently receive an instruction to stop, block or override the transaction to trigger the one or more processor(s) to terminate the transaction program for the transaction.

In operation 1750, one or more processor(s) may skip in real-time and execute, at a significant (e.g. minutes or hours) time delay after transaction times, the security compliance tests skipped for each transaction in the stream to generate time delayed (not real-time) supplemental security assessments therefore comprising time delayed suspicious transaction alerts. In some embodiments, the skipped tests may be executed at the delayed time when computational resources from the fixed network of computers become available. In some embodiments, the skipped tests may be executed at a predefined delayed time or duration after the transaction times or at times after all the not skipped security compliance tests are executed for the same transactions. In some embodiments, the skipped tests may be executed at a second system of computers external to the fixed network of computers that execute the not skipped security compliance tests for the same transactions.

One or more processor(s) may iteratively repeat operations 1700-1750 for each single or multiple (fixed or dynamic) number of transactions, times or time windows (e.g., periodically or with variable frequency), or triggered by condition(s) (e.g., a change in the global trend of cumulative transaction behavior). Additional or different operations may be used, operations may be excluded, and different orders of operations may be used. For example, in some embodiments, when operation 1740 is executed, operation 1750 may be omitted, e.g., if compliance regulations allow.

The following terms may be defined as follows, although different definitions may alternatively be used.

Analytical Engine may refer, for example, to a set of algorithms to detect suspicious activities.

Alert may refer, for example, to an indication of suspicious activity detected by algorithms.

Detection Algorithm may refer, for example, to a set of instructions and/or logic to determine suspicious activity.

Random Forest may refer, for example, to a machine learning model used for predicting the outcome from ram sampling based on majority voting. Machine learning model Random Forest may be a classifier that contains a number of decision trees for various subsets of the given dataset and takes the average to improve the predictive accuracy of that dataset. Instead of relying on one decision tree, the random forest may take the prediction from each tree and based on the majority votes of predictions, predicts the final output.

Threshold/Tolerance may refer, for example, to a value above which analytical model triggers an alert.

Override threshold may refer, for example, to a threshold only applicable for specific entities such as e.g. Symbol/ISIN/Account/etc.

Anomaly may refer, for example, to an event that is different, abnormal, peculiar, and/or not easily classified.

OHLC may refer, for example, to Open, High, Low, and Close values of a traded instrument.

Trading Volume may refer, for example, to a number of shares traded during a particular time period.

Compliance Officer may refer, for example, to a person or entity responsible for investigating alerts generated by the algorithm and determining if they are valid or invalid.

Symbol or stock symbol may refer, for example, to an arrangement of characters (e.g., letters) representing a publicly traded security on an exchange.

A market identifier code (MIC) may refer, for example, to an identifier used to specify stock markets and other exchanges in which securities are traded. The code may be unique and in one example includes four characters, starting with a randomly assigned alphanumeric character, followed by a three-digit code to signify the market, such as XNAS for the Nasdaq market.

Severity may refer, for example, to a number (e.g., between 0 to 100) to rate the severity of an alert.

ISIN is an International Securities Identification Numbering System (e.g., defined by ISO 6166) that may refer, for example, to a global standard for the unique identification of financial and referential instruments, including e.g. equity, debt, derivatives, and indices.

Real-time may refer, for example, to actions executed at simultaneous, overlapping or substantially similar times, for example, within 1-10 seconds or minutes of each other. Time delayed or not real-time may refer, for example, to actions executed after such time scales, for example, more than after tens of minutes or more than 1-10 hours of each other. Real-time and not real-time detection of suspicious transactions may refer to detection that occurs in time scales relative to the time the transaction itself was executed, recorded, or received by the executing device(s) in an incoming data stream.

Embodiments of the invention may improve the technologies of computer automation, machine learning, computer bots, big data analysis, and computer use and automation of fraud detection by using specific algorithms to analyze large pools of data, a task which is impossible, in a practical sense, for a person to carry out in real-time. Embodiments may more effectively, quickly and accurately identify fraudulent or suspicious transactions in real-time to pre-empt and prevent fraud.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method comprising:
   receiving a stream of transactions at a designated network of computers;
   determining that an incoming data rate of the stream of transactions exceeds a computational capability of the designated network of computers to execute a complete set of a plurality of security compliance tests thereon in real- time;
   determining, using a machine learning model, a global trend of cumulative transaction behavior based on all, a majority or a representative subset, of the stream of transactions;
   based on determining that the incoming data rate of the stream of transactions exceeds the computational capability, sorting at a skip rule engine, for each transaction in the stream, to skip or not skip each of the complete set of security compliance tests based on each test's relevance to the global trend of the cumulative transaction behavior;
   executing in real-time the security compliance tests not skipped for each transaction in the stream to generate real-time partial security assessments comprising real-time suspicious transaction alerts for the transactions in the stream;
   skipping in real-time the security compliance tests skipped for each transaction in the stream;

determining, at a time after completion of the transactions, that the designated network of computers has surplus computational capacity; and based on determining that the designated network of computers has surplus computational capacity, executing the security compliance tests skipped for each transaction in the stream to generate time delayed supplemental security assessments comprising time delayed suspicious transaction alerts for the transactions in the stream.

2. The method of claim 1 comprising dynamically updating the machine learning model to adjust the skip rule engine to skip security compliance tests trained based on each test's verified historical relevance to the global trend.

3. The method of claim 1, wherein the skip rule engine sorts each of the complete set of security compliance tests into two classes to skip tests associated with a relatively high, above threshold or maximum relevance to the global trend and to not skip tests associated with a relatively low, below threshold or minimum relevance to the global trend.

4. The method of claim 1, wherein the skip rule engine sorts each of the complete set of security compliance tests into an integer number of three or more classes ordered based on respective degrees of relevance to the global trend, wherein each class of tests is executed sequentially in the order of the class.

5. The method of claim 1, wherein the skip rule engine individually sorts each of the complete set of security compliance tests according to an ordered rank of the test's relevance to the global trend and executes each test sequentially in the rank order of the test.

6. The method of claim 1, wherein the skip rule engine individually sorts each of the complete set of security compliance tests according to a skip ness ranking the test's relevance to the individual instrument trend and executes each test sequentially in the rank order of the test.

7. The method of claim 1 comprising skipping a front-running security compliance test when there is a bearish global trend of the cumulative behavior of the stream of transaction.

8. The method of claim 1 comprising skipping a tailgating security compliance test when there is a bullish global trend of the cumulative behavior of the stream of transaction.

9. The method of claim 1 comprising, in response to receiving a real-time partial security assessment indicating a suspicious transaction event, automatically executing a fraud prevention action.

10. A system comprising:
a designated network of computers comprising:
one or more memories; and
one or more processors configured to:
receive a stream of transactions and store the stream of transactions in the one or more memories
determine that an incoming data rate of the stream of transactions exceeds a computational capability of the designated network of computers to execute a complete set of a plurality of security compliance tests thereon in real-time,
determine, using a machine learning model, a global trend of cumulative transaction behavior based on all, a majority or a representative subset, of the stream of transactions,
based on determining that the incoming data rate of the stream of transactions exceeds the computational capability, sort at a skip rule engine, for each transaction in the stream, to skip or not skip each of the complete set of security compliance tests based on each test's relevance to the global trend of the cumulative transaction behavior,
execute in real-time the security compliance tests not skipped for each transaction in the stream to generate real-time partial security assessments comprising real-time suspicious transaction alerts for the transactions in the stream,
skip in real-time the security compliance tests skipped for each transaction in the stream,
determine, at a time after completion of the transactions, that the designated network of computers has surplus computational capacity, and
based on determining that the designated network of computers has surplus computational capacity, execute the security compliance tests skipped for each transaction in the stream to
generate time delayed supplemental security assessments therefore comprising time delayed suspicious transaction alerts for the transactions in the stream.

11. The system of claim 10, wherein the one or more processors are configured to dynamically update the machine learning model to adjust the skip rule engine to skip security compliance tests trained based on each test's verified historical relevance to the global trend.

12. The system of claim 10, wherein the one or more processors are configured to operate the skip rule engine to sort each of the complete set of security compliance tests into two classes to skip tests associated with a relatively high, above threshold or maximum relevance to the global trend and to not skip tests associated with a relatively low, below threshold or minimum relevance to the global trend.

13. The system of claim 10, wherein the one or more processors are configured to operate the skip rule engine to sort each of the complete set of security compliance tests into an integer number of three or more classes ordered based on respective degrees of relevance to the global trend, wherein each class of tests is executed sequentially in the order of the class.

14. The system of claim 10, wherein the one or more processors are configured to operate the skip rule engine to individually sort each of the complete set of security compliance tests according to an ordered rank of the test's relevance to the global trend and executes each test sequentially in the rank order of the test.

15. The system of claim 10, wherein the one or more processors are configured to operate the skip rule engine to individually sort each of the complete set of security compliance tests according to a skip ness ranking the test's relevance to the individual instrument trend and executes each test sequentially in the rank order of the test.

16. The system of claim 10, wherein the one or more processors are configured to, in response to receiving a real-time partial security assessment indicating a suspicious transaction event, automatically execute a fraud prevention action.

* * * * *